(12) United States Patent
Connell et al.

(10) Patent No.: US 12,490,807 B2
(45) Date of Patent: Dec. 9, 2025

(54) BLADDER FOR AN ARTICLE OF FOOTWEAR

(71) Applicant: NIKE, Inc., Beaverton, OR (US)

(72) Inventors: Jeremy L. Connell, Portland, OR (US); Craig Fredrick, Portland, OR (US); Jason R. Meeker, Portland, OR (US); Chris Wilburn, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 7 days.

(21) Appl. No.: 18/335,699

(22) Filed: Jun. 15, 2023

(65) Prior Publication Data

US 2023/0404210 A1 Dec. 21, 2023

Related U.S. Application Data

(60) Provisional application No. 63/352,732, filed on Jun. 16, 2022.

(51) Int. Cl.
*A43B 13/20* (2006.01)

(52) U.S. Cl.
CPC ................... *A43B 13/20* (2013.01)

(58) Field of Classification Search
CPC ...... A43B 13/20; A43B 13/206; A43B 13/189
See application file for complete search history.

(56) References Cited

U.S. PATENT DOCUMENTS 4,346,489 A * 8/1982 McMullan ........... A47C 20/041
5/915
5,625,964 A * 5/1997 Lyden ................... A43B 13/20
36/114
5,686,167 A * 11/1997 Rudy ................... A43B 13/206
428/167

(Continued)

FOREIGN PATENT DOCUMENTS

TW 202131816 A 9/2021
WO WO-2016014638 A1 1/2016

(Continued)

OTHER PUBLICATIONS

Taiwan Intellectual Property Office, Office Action for TW App. No. 112122614, issued Mar. 19, 2024.

(Continued)

*Primary Examiner* — Heather Mangine
(74) *Attorney, Agent, or Firm* — Honigman LLP; Matthew H. Szalach; Jonathan P. O'Brien

(57) ABSTRACT

A bladder including a first barrier element having a first surface formed on a first side of the first barrier element and a second surface formed on an opposite side of the first barrier element than the first surface, a second barrier element having a third surface formed on a first side of the second barrier element and a fourth surface formed on an opposite side of the second barrier element than the third surface, and a peripheral seam joining the first barrier element and the second barrier element to define an interior void between the first surface and the third surface, the peripheral seam including a first segment extending along the bladder proximate to the second surface, a second segment extending along the bladder proximate to the fourth surface, and a third segment extending between and connecting the first segment and the second segment.

18 Claims, 19 Drawing Sheets

(56) References Cited

U.S. PATENT DOCUMENTS

| | | | |
|---|---|---|---|
| 6,453,577 B1 | 9/2002 | Litchfield et al. | |
| 7,118,437 B1* | 10/2006 | Bradley | B63C 9/1255 |
| | | | 441/118 |
| 11,026,476 B2 | 6/2021 | Eldem et al. | |
| 11,517,074 B2 | 12/2022 | VanDomelen | |
| 2003/0183324 A1* | 10/2003 | Tawney | A43B 13/20 |
| | | | 156/289 |
| 2006/0277794 A1* | 12/2006 | Schindler | A43B 13/203 |
| | | | 36/28 |
| 2007/0119075 A1* | 5/2007 | Schindler | B29C 49/48 |
| | | | 36/35 B |
| 2012/0233885 A1* | 9/2012 | Shaffer | A43B 13/20 |
| | | | 36/83 |
| 2016/0295967 A1* | 10/2016 | Campos, II | A43B 13/20 |
| 2016/0295968 A1* | 10/2016 | Campos, II | A43B 13/184 |
| 2017/0042286 A1* | 2/2017 | Meschter | A43B 13/04 |
| 2017/0119096 A1* | 5/2017 | Greene | B29D 35/122 |
| 2018/0303200 A1* | 10/2018 | Greene | A43B 13/223 |
| 2018/0332925 A1* | 11/2018 | Bailey | A43B 17/006 |
| 2019/0231028 A1* | 8/2019 | Eldem | A43B 13/186 |
| 2020/0022454 A1* | 1/2020 | Eldem | A43B 21/26 |
| 2020/0022455 A1* | 1/2020 | Eldem | A43B 13/127 |
| 2020/0154825 A1* | 5/2020 | Case | A43B 21/28 |
| 2020/0154826 A1* | 5/2020 | Case | A43B 13/20 |
| 2020/0205514 A1* | 7/2020 | VanDomelen | A43B 13/188 |
| 2020/0305551 A1* | 10/2020 | Campos, II | A43B 13/127 |
| 2020/0359742 A1* | 11/2020 | Campos, II | A43B 13/206 |
| 2020/0390189 A1* | 12/2020 | Campos, II | A43B 13/189 |
| 2021/0145118 A1* | 5/2021 | Campos, II | A43B 13/125 |
| 2021/0195996 A1* | 7/2021 | Chan | A43B 13/186 |
| 2021/0353001 A1* | 11/2021 | Elder | A43B 13/127 |
| 2021/0368918 A1* | 12/2021 | Lyke | A43B 13/36 |
| 2021/0368922 A1* | 12/2021 | Ho | A43B 13/20 |
| 2022/0047040 A1* | 2/2022 | Durflinger | A43B 13/185 |
| 2022/0202136 A1* | 6/2022 | Campos, II | A43B 13/20 |
| 2022/0378150 A1* | 12/2022 | Brooks | A43B 13/16 |
| 2023/0043845 A1 | 2/2023 | Bandyopadhyay et al. | |
| 2023/0189925 A1* | 6/2023 | Andreasen | A43B 7/144 |
| | | | 36/29 |
| 2023/0301397 A1* | 9/2023 | Campos, II | A43B 1/0072 |
| 2023/0404210 A1* | 12/2023 | Connell | A43B 13/20 |

FOREIGN PATENT DOCUMENTS

| | | |
|---|---|---|
| WO | WO-2016164559 A1 | 10/2016 |
| WO | WO-2017079256 A1 | 5/2017 |
| WO | WO-2021101971 A1 | 5/2021 |

OTHER PUBLICATIONS

European Patent Office (ISA), International Search Report and Written Opinion for PCT App. No. PCT/US2024/034232, mailed Sep. 20, 2024.

European Patent Office (ISA), International Search Report and Written Opinion for PCT App. No. PCT/US23/68560, mailed Sep. 14, 2023.

* cited by examiner

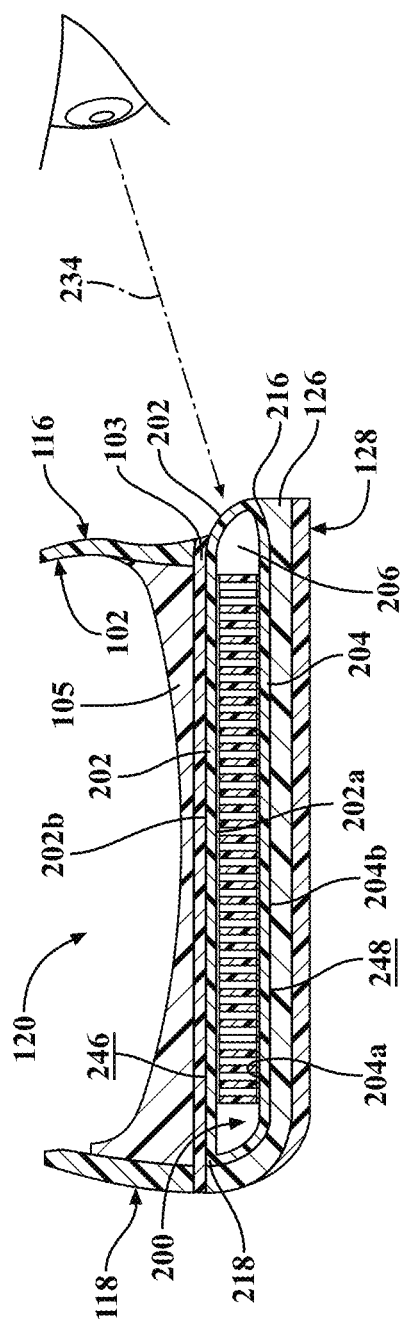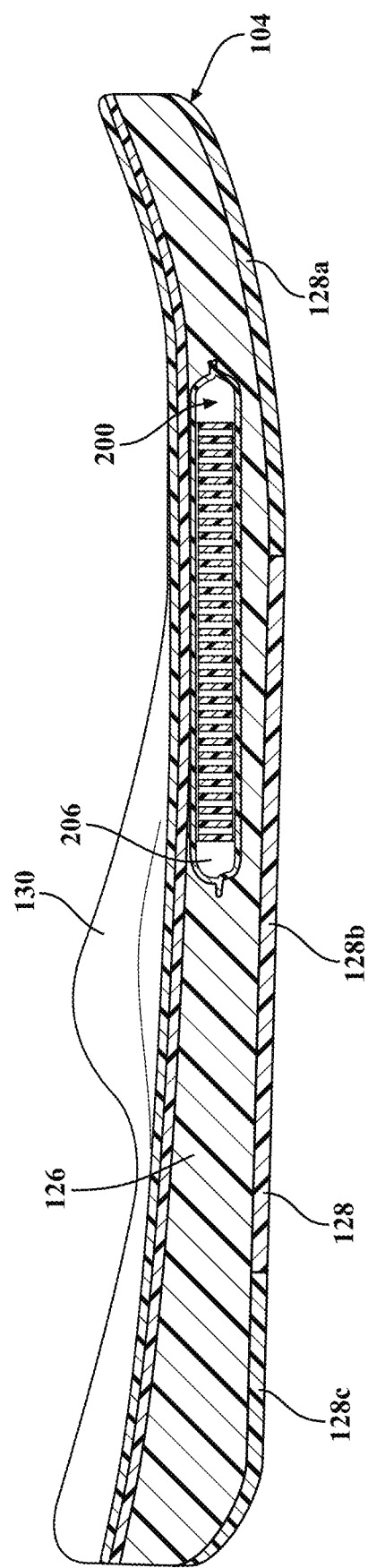
FIG. 5
FIG. 6

BLADDER FOR AN ARTICLE OF FOOTWEAR

CROSS REFERENCE TO RELATED APPLICATION

This application claims priority to U.S. Provisional Application Ser. No. 63/352,732, filed Jun. 16, 2022, the disclosure of which is hereby incorporated by reference in its entirety.

FIELD

The present disclosure relates generally to a fluid-filled chamber and, more particularly, to a fluid-filled chamber for an article of footwear.

BACKGROUND

This section provides background information related to the present disclosure and is not necessarily prior art.

Fluid-filled chambers or bladders are used in articles of footwear to provide cushioning and other performance characteristics during use. Such bladders typically include one or more polymeric films forming an outer layer of the bladder and defining an interior chamber that contains a compressible material, such as a fluid, an elastomeric material, and/or a tensile structure. The fluid and/or elastomeric material provide the bladder with the ability to absorb and cushion forces applied thereto while the tensile member helps maintain a desired shape of the bladder in a relaxed state.

In articles of footwear, bladders are traditionally concealed within a sole structure of the article of footwear to provide cushioning and responsiveness to a wearer during use. Such bladders may be contained within a midsole of the article of footwear and, as a result, are hidden from view. Alternatively, a midsole may include an opening where the bladder is visible at a sidewall of the sole structure. Such openings may be so large, in fact, that the bladder forms a majority of a thickness of the sole structure. In such a configuration, a sidewall of the bladder may extend between and join an upper of the article of footwear and a ground-engaging surface of the article of footwear.

Regardless of the particular structure of the bladder and its relationship to other components of the sole structure, the bladder is often positioned within the sole structure at a specific location to provide a wearer with cushioned support during use. For example, a bladder may be positioned in a heel region of the sole structure to cushion an initial impact of a wearer's foot during a walking or running movement. Alternatively, a bladder may extend from a heel region of the sole structure to a forefoot region of the sole structure to effectively cushion a wearer's foot throughout an entire gait cycle. Such bladders effectively and efficiently absorb forces associated with the wearer's foot impacting a ground surface and, thus, provide the wearer with a degree of comfort and support.

While conventional bladders provide a wearer with a degree of comfort and support during use, a continuous need exists to develop bladders that provide targeted support and response for particular movements and activities.

DRAWINGS

The drawings described herein are for illustrative purposes only of selected configurations and not all possible implementations, and are not intended to limit the scope of the present disclosure.

FIG. 5 is a cross-sectional view of the article of footwear of FIG. 1, taken along line 5-5 of FIG. 4;

FIG. 6 is a cross-sectional view of the article of footwear of FIG. 1, taken along line 6-6 of FIG. 4;

Figure 1:
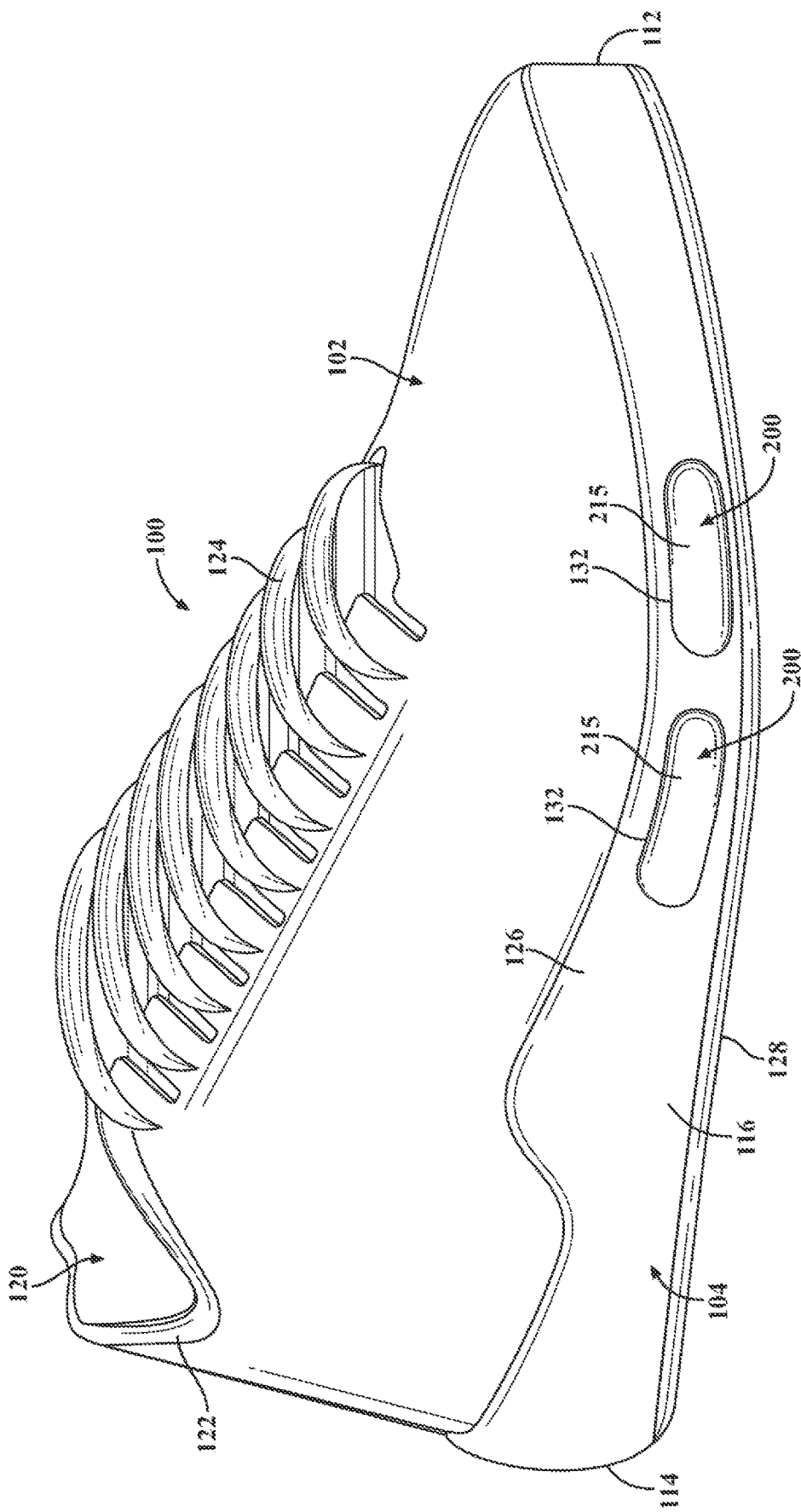
FIG. 1 is a perspective view of an article of footwear comprising a bladder, according to one example.
Figure 7:
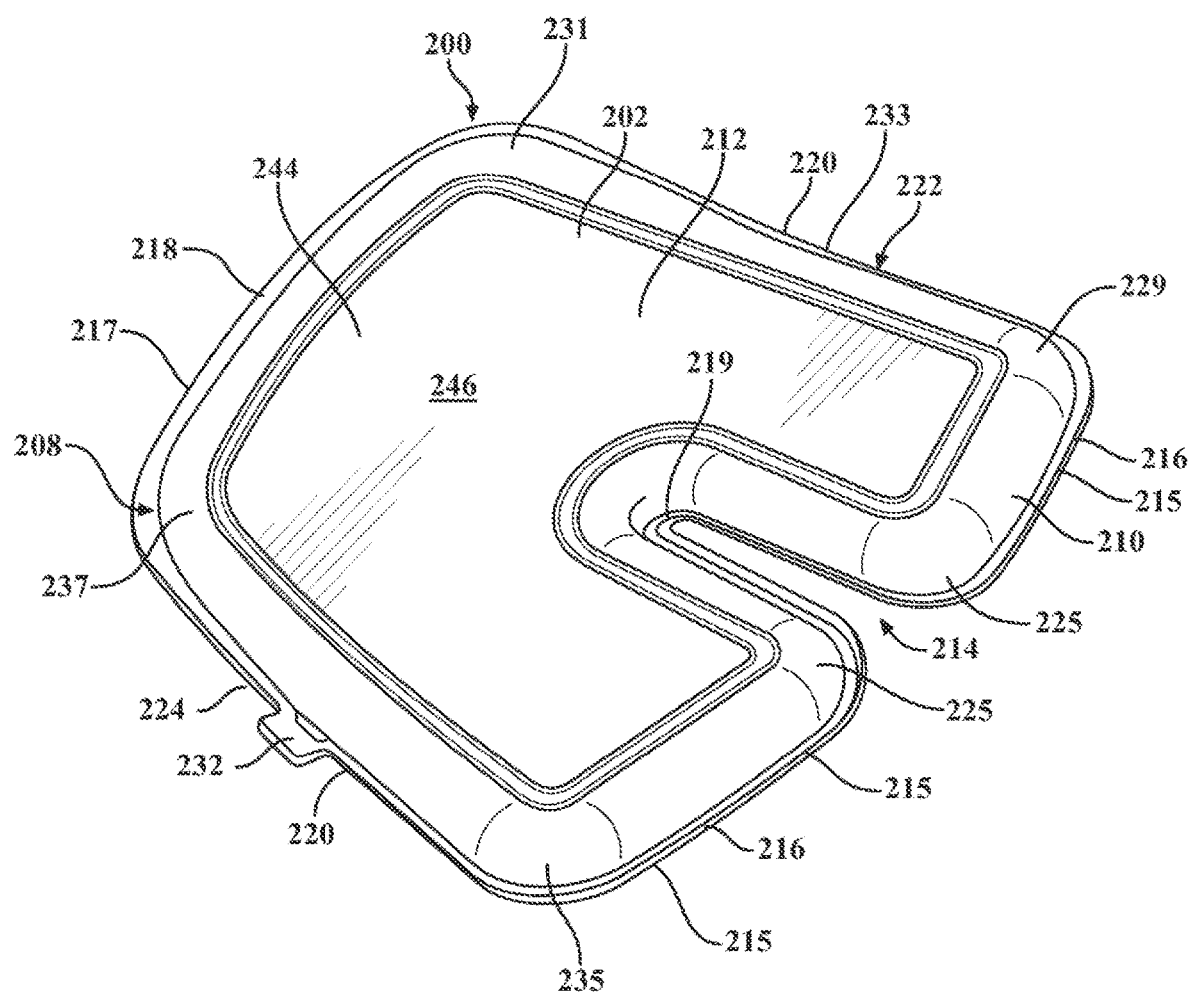
Figure 8:
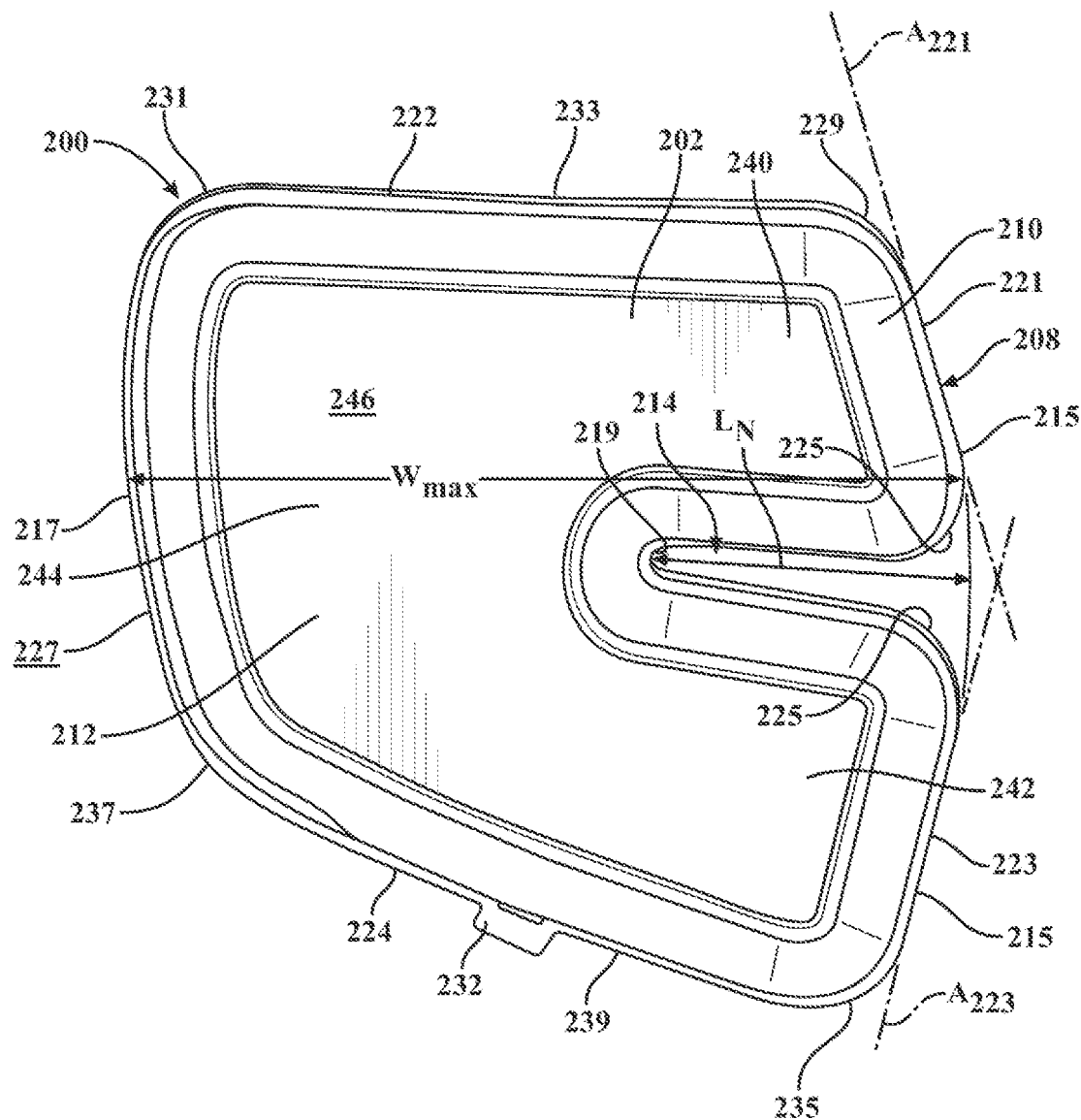
Figure 9:
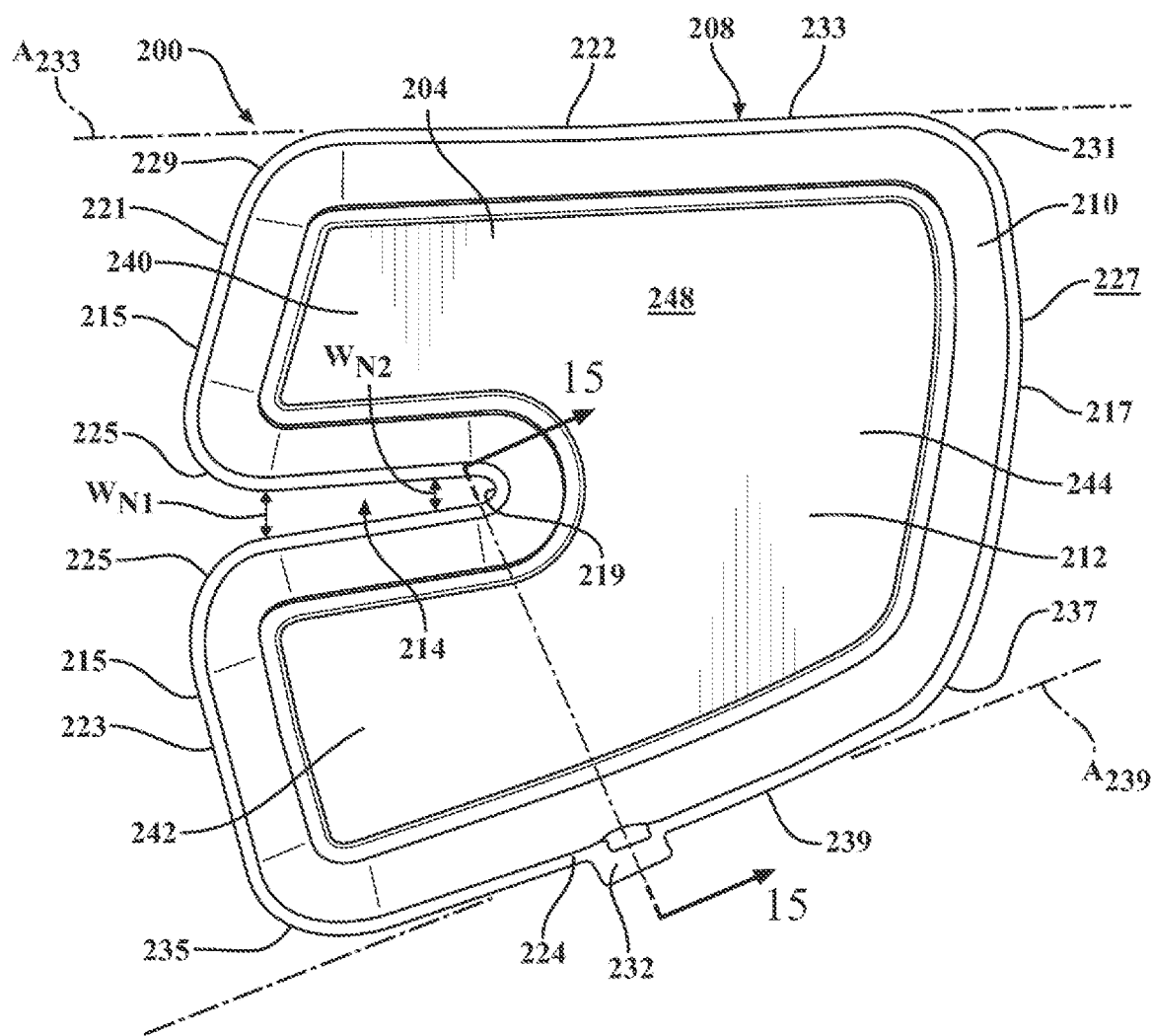
Figure 10:
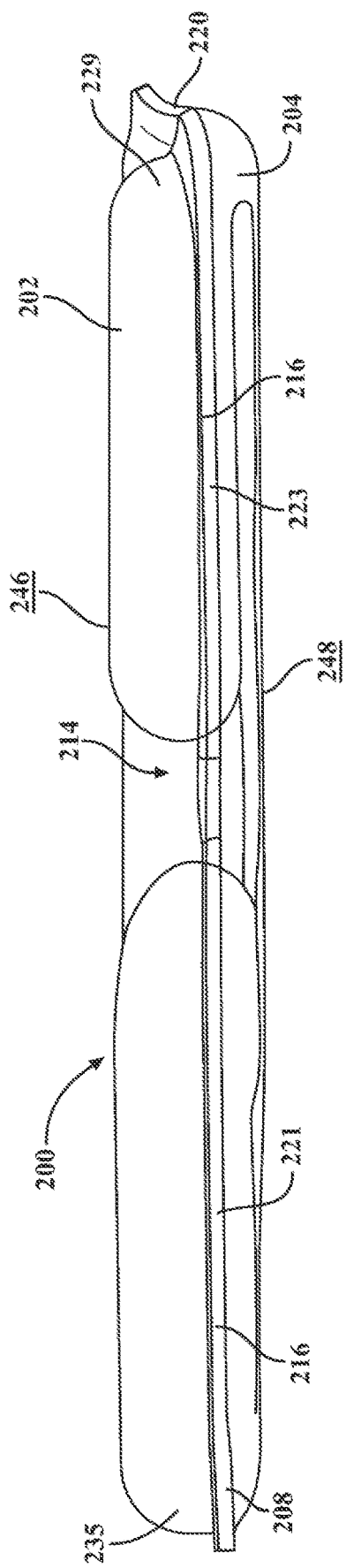
Figure 11:
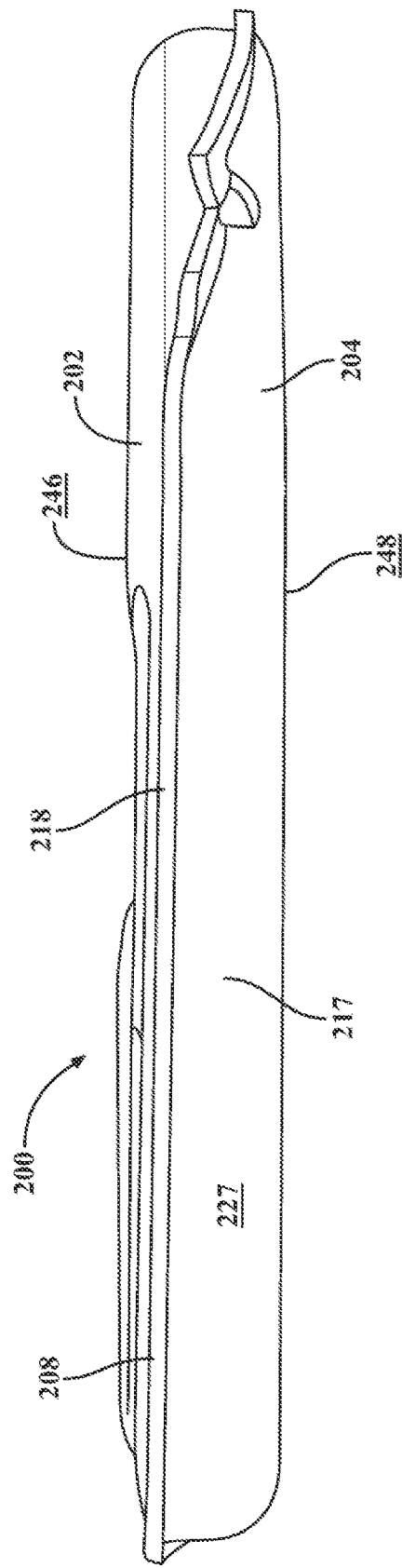
Figure 12:
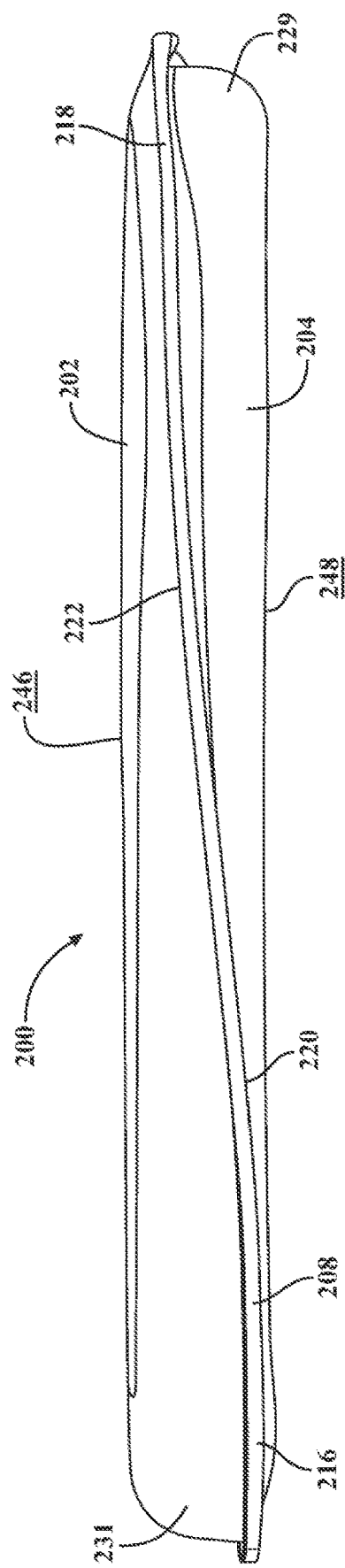
Figure 13:
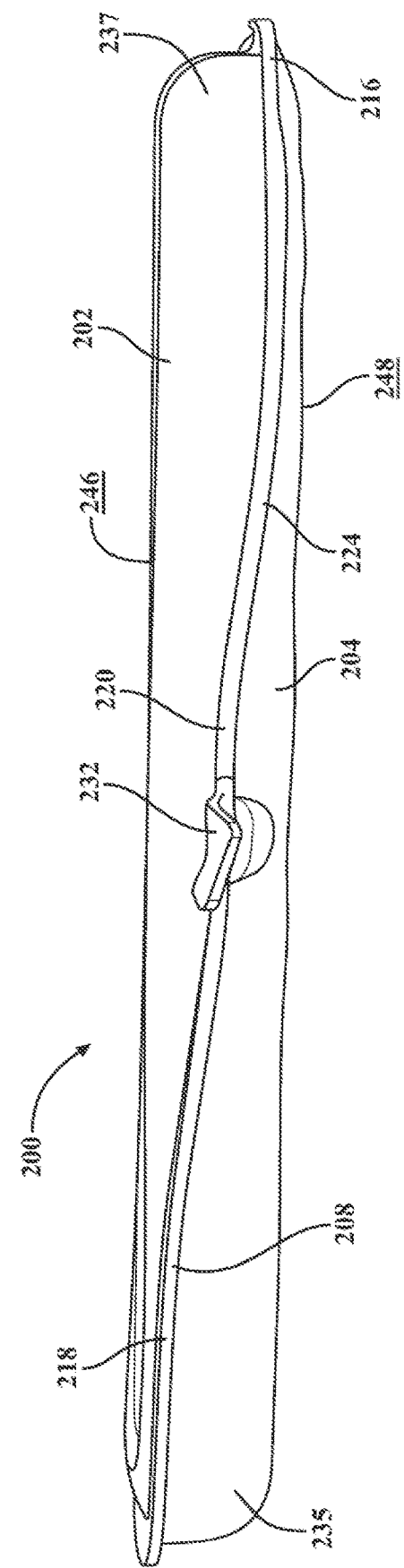
Figure 14:
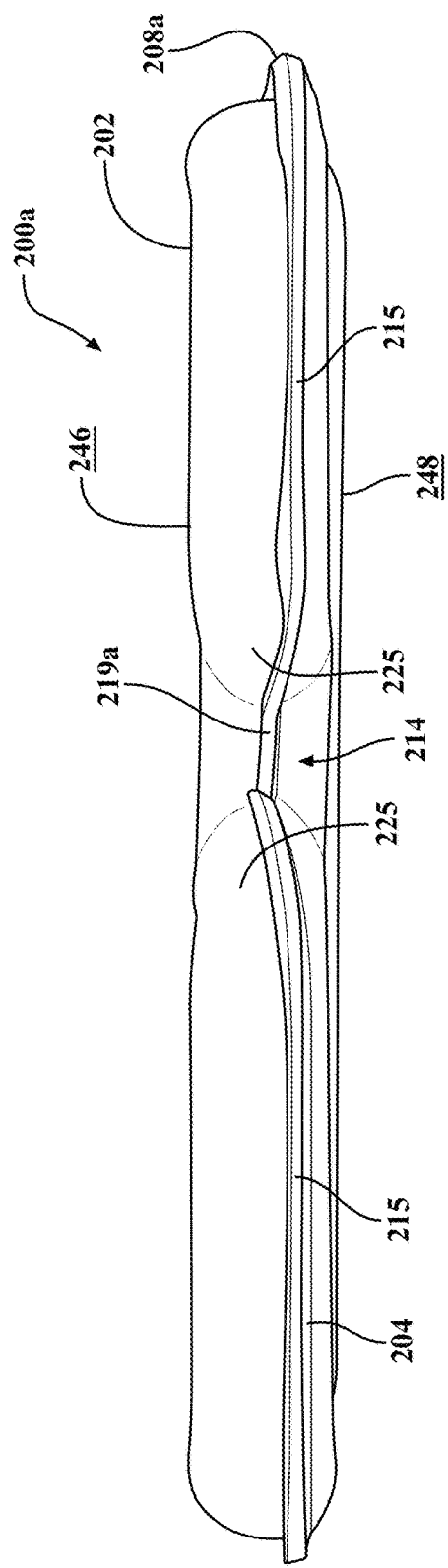
Figure 15:
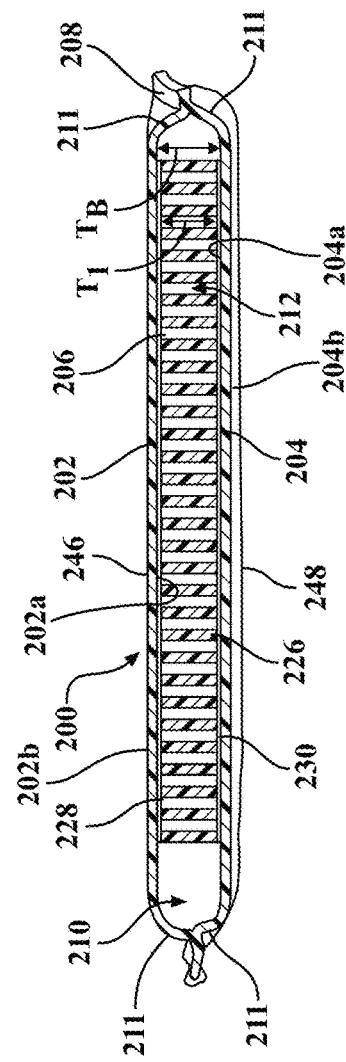
Figure 16:
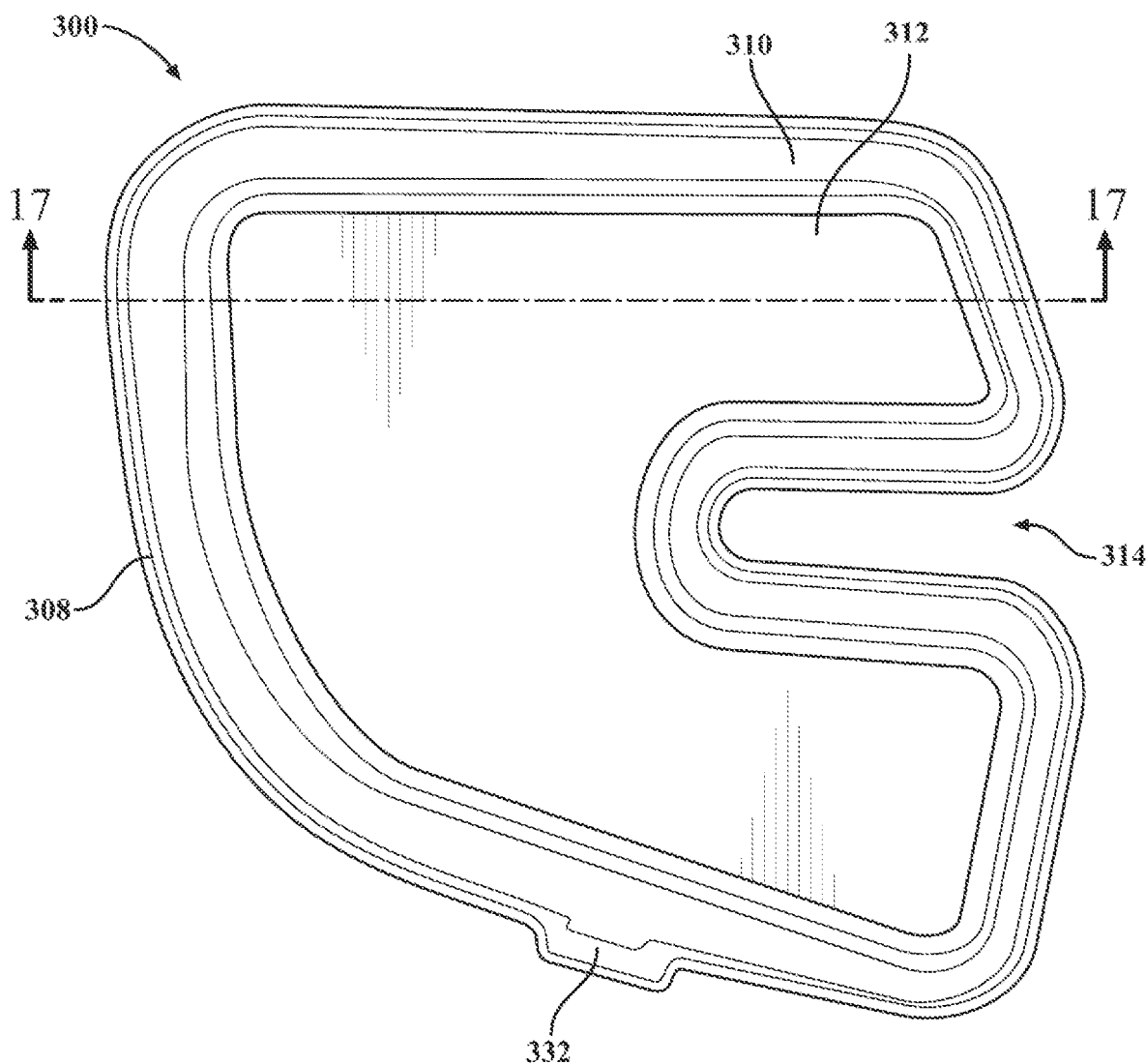
Figure 17:
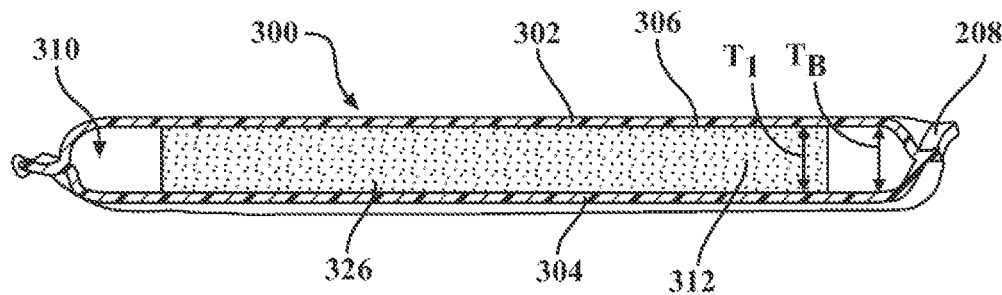
Figure 18:
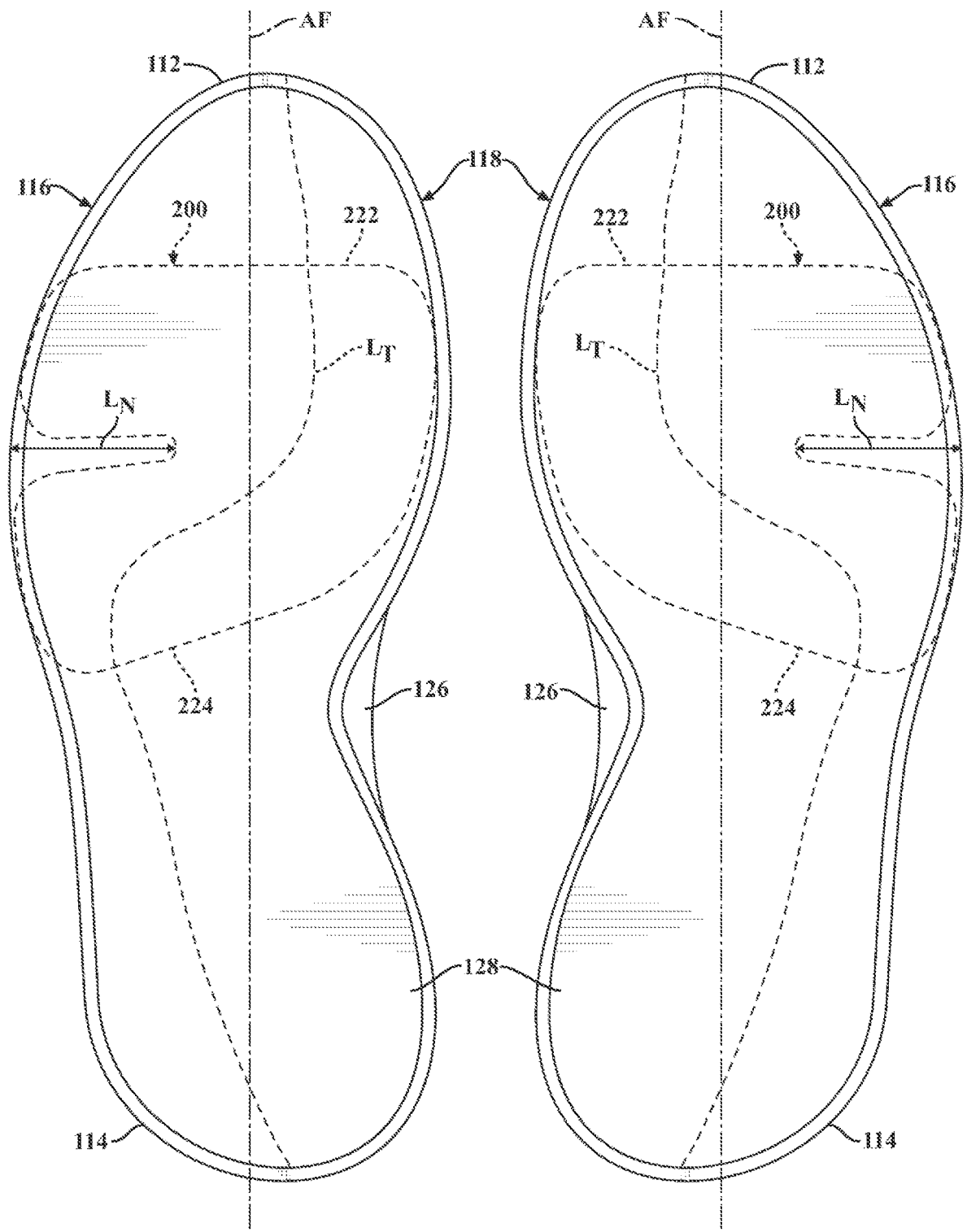
Figure 19:
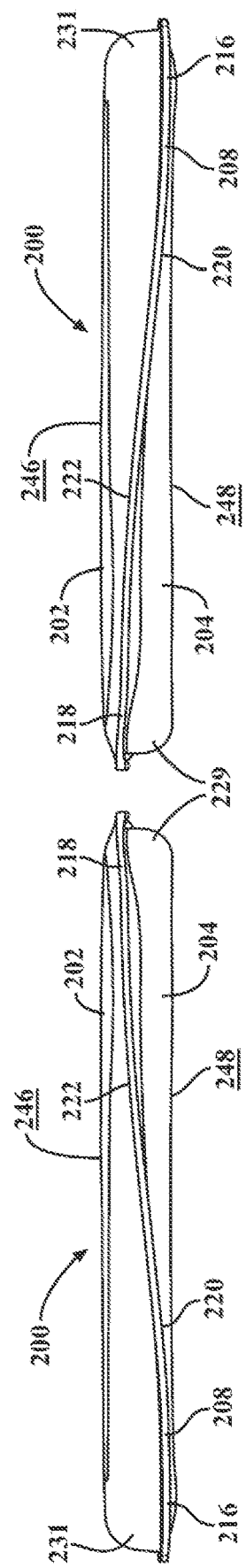
Figure 20:
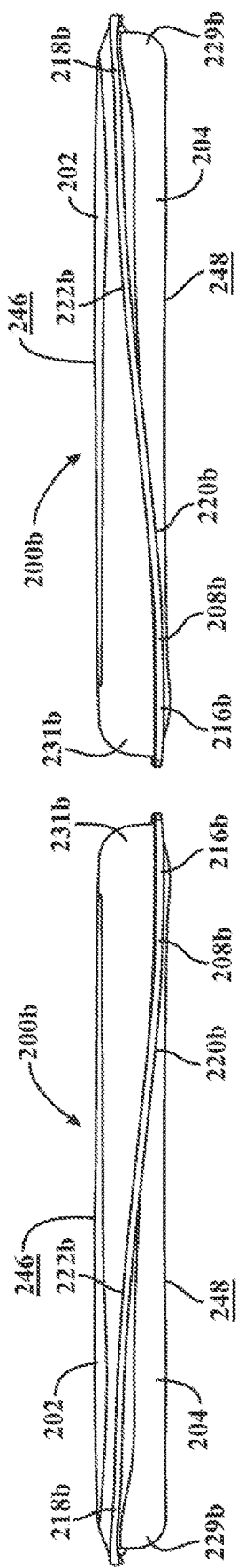
Figure 21:
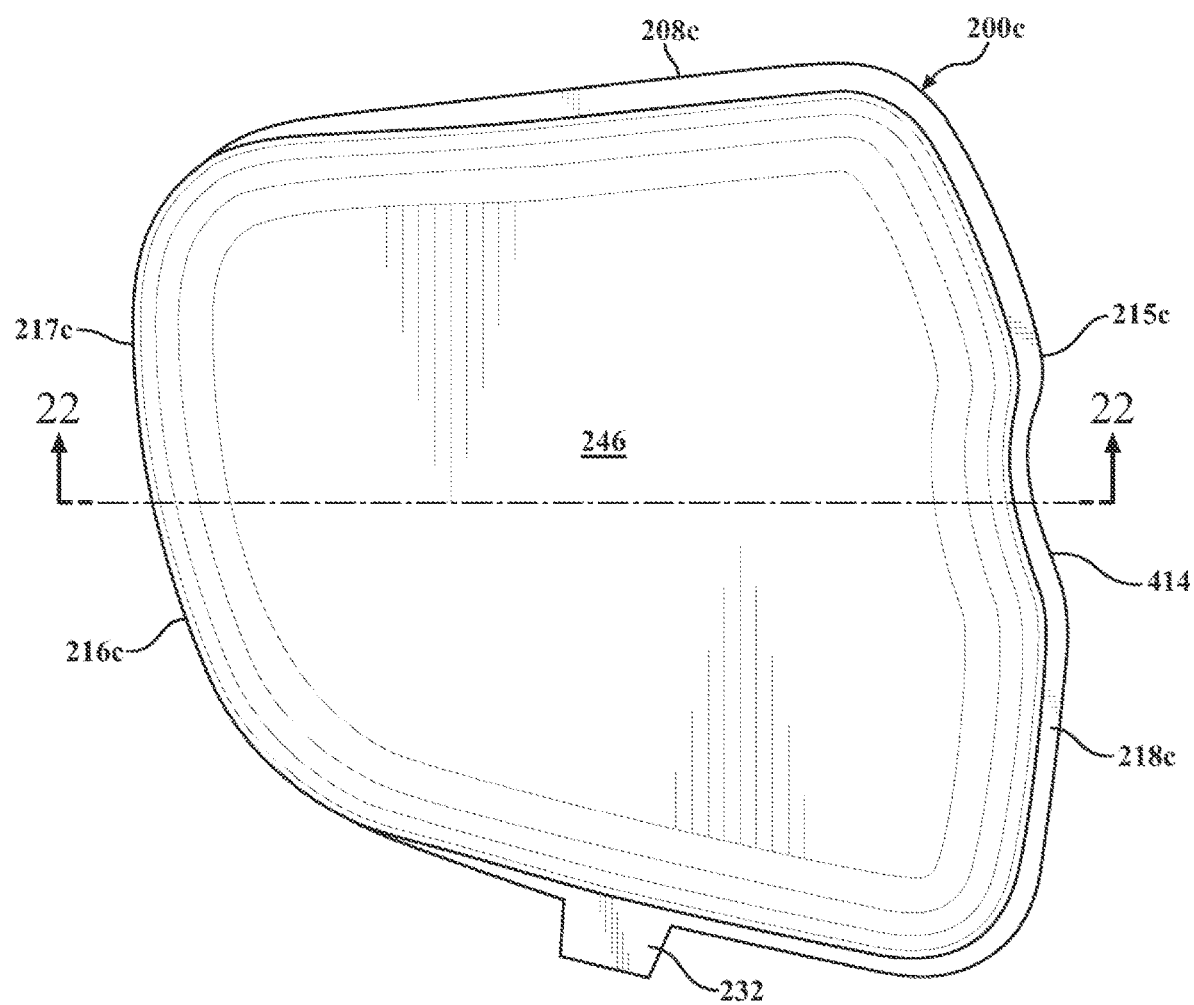
Figure 22:
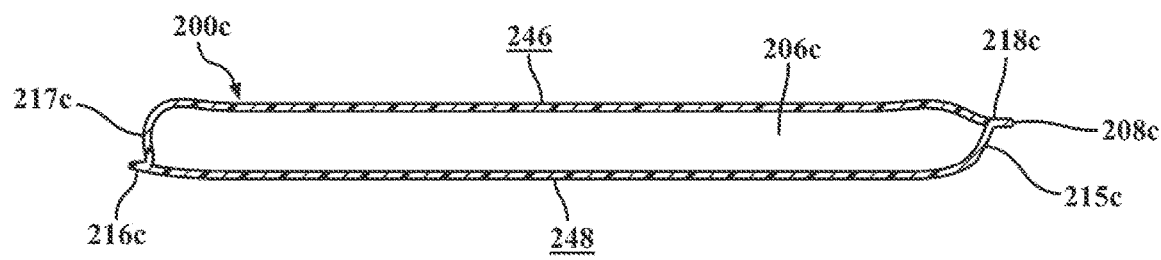
Figure 23:
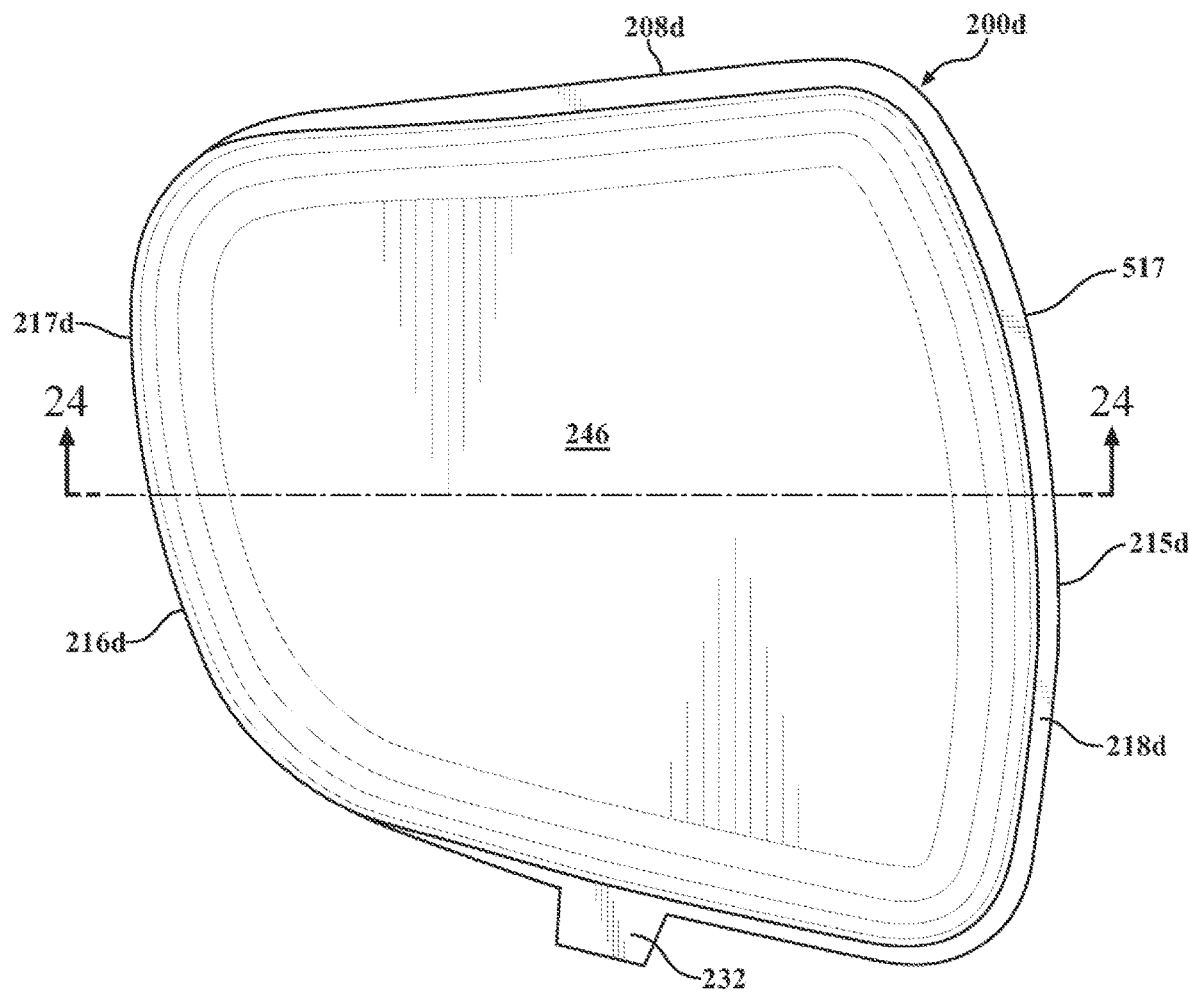
Figure 24:
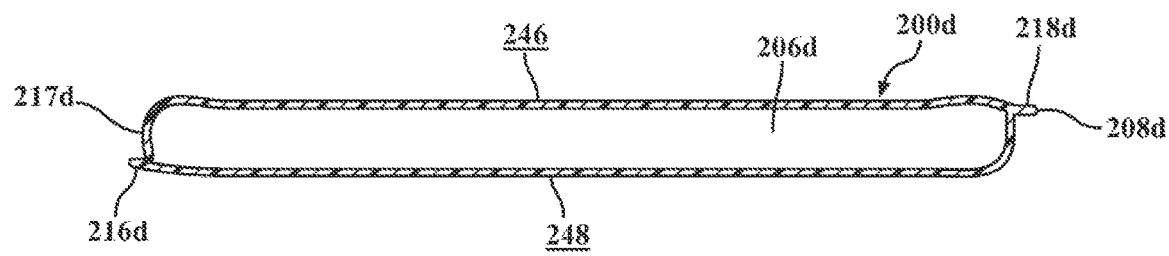
Figure 25:
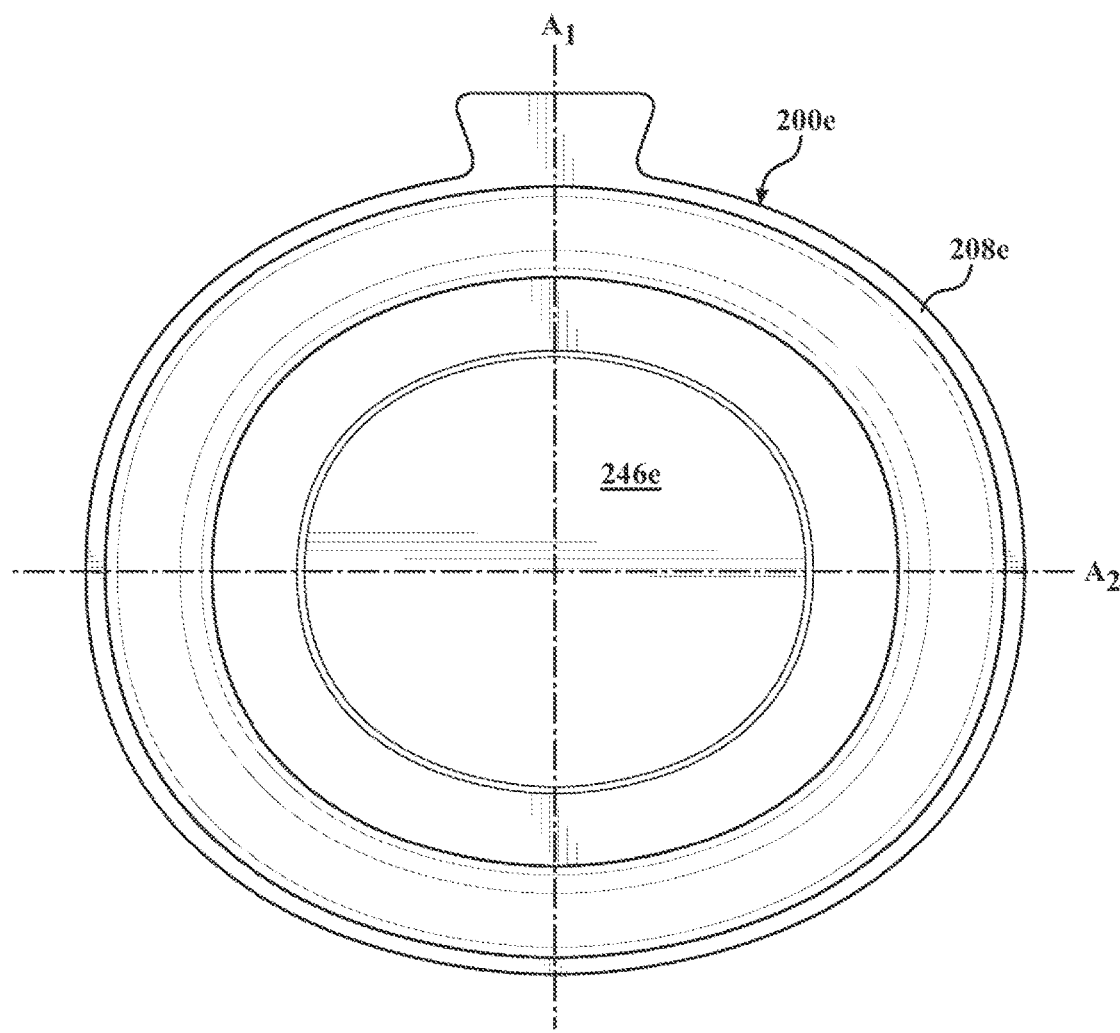
Figure 26:
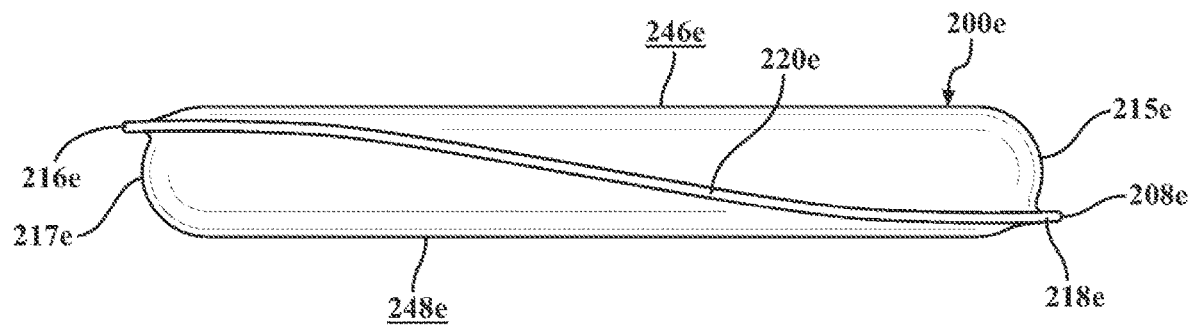
Figure 27:
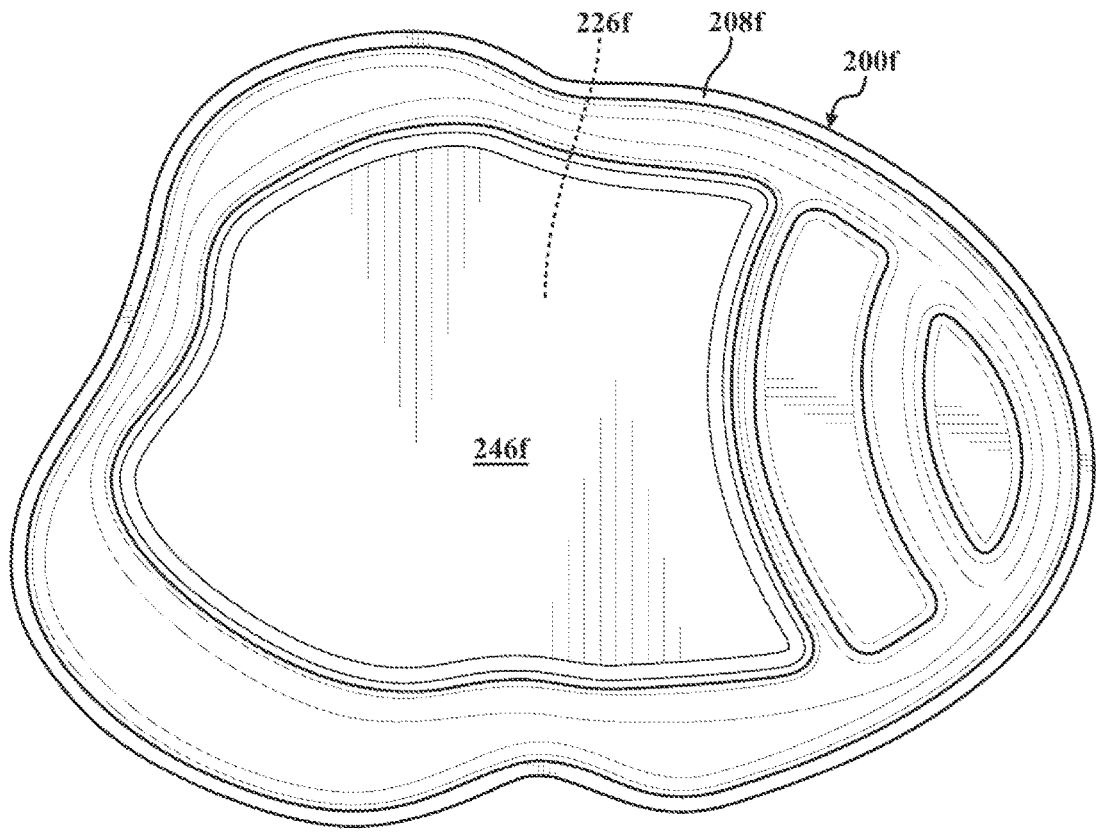
Figure 28:
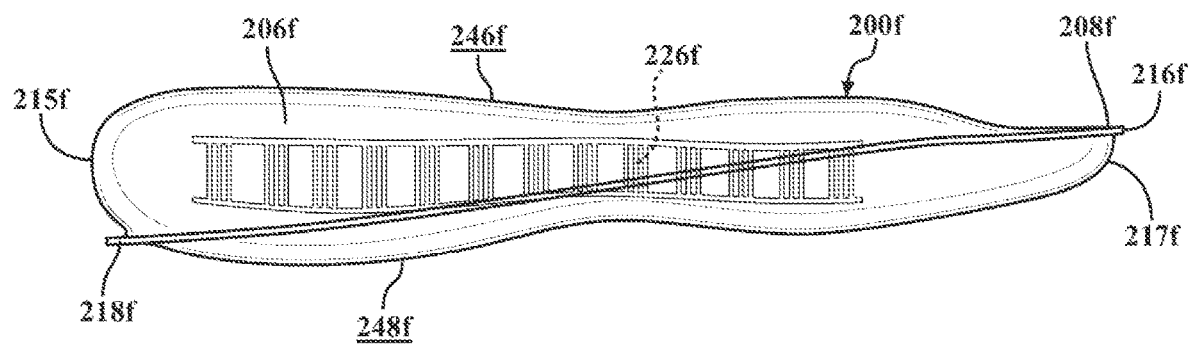

FIG. 7 a perspective view of a bladder of the article of footwear of FIG. 1;

FIG. 8 is a superior side view of the bladder of FIG. 7;

FIG. 9 is an inferior side view of the bladder of FIG. 7;

FIG. 10 is a lateral side view of the bladder of FIG. 7;

FIG. 11 is a medial side view of the bladder of FIG. 7;

FIG. 12 is an anterior side view of the bladder of FIG. 7;

FIG. 13 is a posterior side view of the bladder of FIG. 7;

FIG. 14 is a lateral side view of an alternate configuration for the bladder of FIG. 7;

FIG. 15 is a cross-sectional view of the bladder of FIG. 7, taken along line 15-15 of FIG. 9;

FIG. 16 is a superior view of a bladder in a accordance with the principles of the present disclosure;

FIG. 17 is a cross-sectional view of the bladder of FIG. 16, taken along line 17-17 of FIG. 16;

FIG. 18 is a bottom view of a first sole structure in accordance with the principles of the present disclosure for use with a left foot and a bottom view of a second sole structure in accordance with the principles of the present disclosure for use with a right foot;

FIG. 19 is a side-by-side view of a first bladder of the first sole structure of FIG. 18 and a second bladder of the second sole structure of FIG. 18;

FIG. 20 is a side-by-side view of an alternate first bladder of the first sole structure of FIG. 18 and an alternate second bladder of the second sole structure of FIG. 18;

FIG. 21 is an inferior view of a bladder for use with the article of footwear of FIG. 1;

FIG. 22 is a cross-sectional view of the bladder of FIG. 21 taken along line 22-22 of FIG. 21;

FIG. 23 is an inferior view of a bladder for use with the article of footwear of FIG. 1;

FIG. 24 is a cross-sectional view of the bladder of FIG. 23 taken along line 24-24 of FIG. 23;

FIG. 25 is a superior view of a bladder for use with the article of footwear of FIG. 1;

FIG. 26 is a side view of the bladder of FIG. 25;

FIG. 27 is a superior view of a bladder for use with the article of footwear of FIG. 1; and FIG. 28 is a side view of the bladder of FIG. 27.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (, "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In one configuration, a bladder includes a first barrier element having a first surface formed on a first side of the first barrier element and a second surface formed on an opposite side of the first barrier element than the first surface, a second barrier element having a third surface formed on a first side of the second barrier element and a fourth surface formed on an opposite side of the second barrier element than the third surface, and a peripheral seam joining the first barrier element and the second barrier element to define an interior void between the first surface and the third surface, the peripheral seam including a first segment extending along the bladder proximate to the second surface, a second segment extending along the bladder proximate to the fourth surface, and a third segment extending between and connecting the first segment and the second segment.

The bladder may include one or more of the following optional features. For example, the third segment may extend through a majority of a thickness of the bladder from the first segment to the second segment. Further, the third segment may include a substantially constant slope between the first segment and the second segment.

In one configuration, a notch may extend into the bladder from a peripheral edge of the bladder to define a channel. In this configuration, the peripheral seam may include a fourth segment extending along a first edge of the notch, a fifth segment extending along a second edge of the notch, and a sixth segment extending along a distal end of the notch and connecting the fourth segment and the fifth segment. The fourth segment, the fifth segment, and the sixth segment may extend along the bladder proximate to one of the second surface and the fourth surface. Alternatively, the fourth segment may extend along the bladder proximate to one of the second surface and the fourth surface and the fifth segment may extend along the bladder proximate to the other of the second surface and the fourth surface. In this alternate configuration, the sixth segment may extend through a majority of a thickness of the bladder from the fourth segment to the fifth segment.

The bladder may be pressurized and/or may be incorporated into an article of footwear.

In another configuration, a bladder includes a first barrier element having a first surface formed on a first side of the first barrier element and a second surface formed on an opposite side of the first barrier element than the first surface, a second barrier element having a third surface formed on a first side of the second barrier element and a fourth surface formed on an opposite side of the second barrier element than the third surface, and a peripheral seam joining the first barrier element and the second barrier element to define an interior void between the first surface and the third surface, the peripheral seam including a first segment extending along the bladder proximate to the second surface at a first side of the bladder and a second segment extending along the bladder proximate to the fourth surface on an opposite, second side of the bladder.

The bladder may include one or more of the following optional features. For example, a third segment may extend through a majority of a thickness of the bladder from the first segment to the second segment. The third segment may include a substantially constant slope between the first segment and the second segment.

In one configuration, a notch may extend into the bladder from a peripheral edge of the bladder to define a channel. In this configuration, the peripheral seam may include a fourth segment extending along a first edge of the notch, a fifth segment extending along a second edge of the notch, and a sixth segment extending along a distal end of the notch and connecting the fourth segment and the fifth segment. The fourth segment, the fifth segment, and the sixth segment may extend along the bladder proximate to one of the second surface and the fourth surface. Alternatively, the fourth segment may extend along the bladder proximate to one of the second surface and the fourth surface and the fifth segment may extend along the bladder proximate to the other of the second surface and the fourth surface. In this alternate configuration, the sixth segment may extend through a majority of a thickness of the bladder from the fourth segment to the fifth segment.

The bladder may be pressurized and/or may be incorporated into an article of footwear.

The details of one or more implementations of the disclosure are set forth in the accompanying drawings and the description below. Other aspects, features, and advantages will be apparent from the description, the drawings, and the claims.

Figure 2:
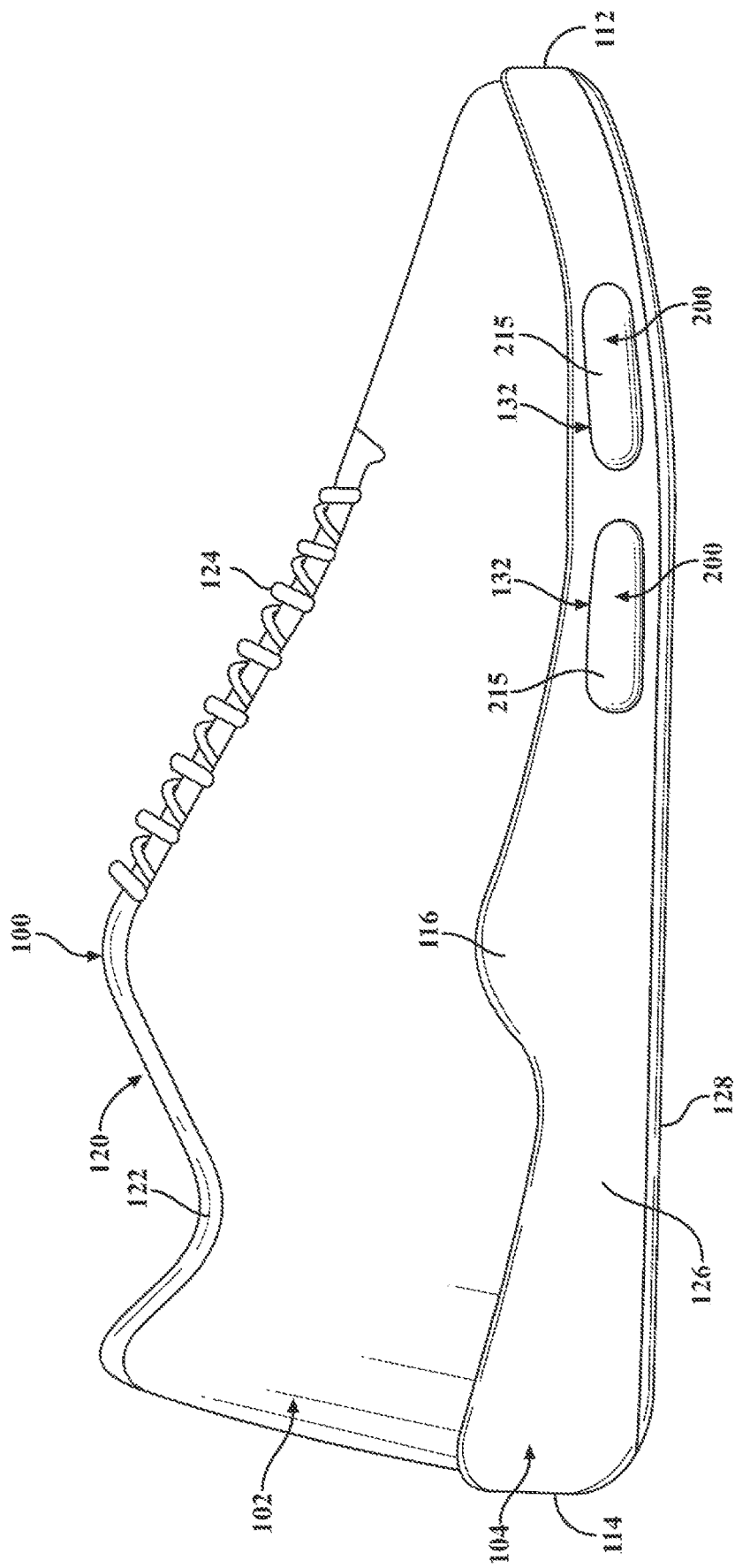
FIG. 2 is a lateral side view of the article of footwear of FIG. 1.
Figure 3:
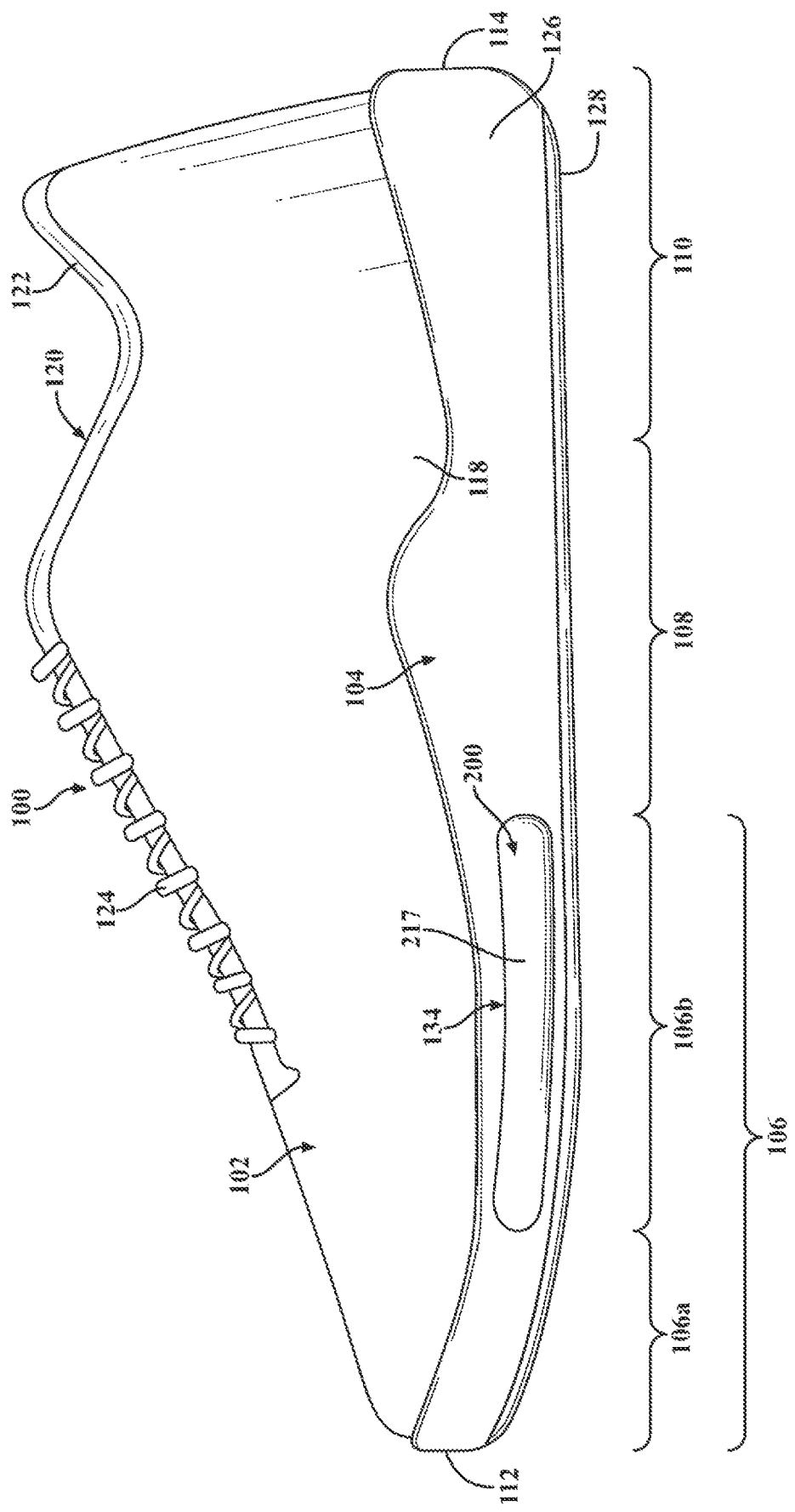
FIG. 3 is a medial side view of the article of footwear of FIG. 1.

FIGS. 1-6 depict an article of footwear 100 in accordance with the principles of the present disclosure. The article of footwear 100 includes an upper 102 and a sole structure 104 and may be divided into one or more regions. Referring to FIG. 3, the regions may include a forefoot region 106, a midfoot region 108, and a heel region 110. The forefoot region 106 may be subdivided into a toe portion 106a corresponding with phalanges, and a ball portion 106b associated with metatarsal bones of a foot. The midfoot region 108 may correspond with an arch area of the foot while the heel region 110 may correspond with rear portions of the foot, including a calcaneus bone. The footwear 100 may further include an anterior end 112 associated with a forward-most point of the forefoot region 106 and a posterior end 114 associated with a rearward-most point of the heel region 110. A longitudinal axis AF of the footwear 100 extends along a length of the footwear 100 from the anterior end 112 to the posterior end 114, and generally divides the footwear 100 at its widest location into a lateral side 116 and a medial side 118. Accordingly, the lateral side 116 and the medial side 118 respectively correspond with opposite sides of the footwear 100 and extend through the regions 106, 108, 110.

The upper 102 of the footwear 100 includes interior surfaces that define an interior void 120 configured to receive and secure a foot for support on the sole structure 104. The upper 102 may be formed from one or more materials that are stitched or adhesively bonded together to form the interior void 120. Suitable materials of the upper may include, but are not limited to, mesh, textiles, foam, leather, and synthetic leather. The materials may be selected and located to impart properties of durability, air-permeability, wear-resistance, flexibility, and comfort.

In some examples, the upper 102 includes a strobel 103 (FIG. 5) having a bottom surface opposing the sole structure 104 and an opposing top surface defining a footbed of the interior void 120. Stitching and/or adhesives may secure the strobel 103 to the upper 102 around a bottom, perimeter edge of the upper 102. In one configuration, the footbed may be contoured to conform to a profile of the bottom surface (e.g., plantar) of the foot.

Optionally, the upper 102 may also incorporate additional layers such as an insole or sockliner 105 (FIG. 5) that may be received within the interior void 120 and reside on the strobel 103. The insole 105 may be formed from a pliable material such as, for example, foam and may receive a plantar surface of the foot to enhance the comfort of the article of footwear 100 during wear. An ankle opening 122 in the heel region 110 of the upper 102 may provide access to the interior void 120. For example, the ankle opening 122 may receive a foot to secure the foot within the interior void 120 and facilitate entry and removal of the foot to and from the interior void 120.

In some examples, one or more fasteners 124 are adjustably coupled to the upper 102. The fasteners 124 can be used to adjust a fit of the interior void 120 around the foot and to accommodate entry and removal of the foot therefrom. The fasteners 124 may include laces, straps, cords, hook-and-loop, and/or any other suitable type of fastener. In some instances, the upper 102 may include a tongue portion (not shown) that extends between the interior void 120 and the fasteners 124.

Referring to FIG. 1, the sole structure 104 of the article of footwear 100 includes a midsole 126 and an outsole 128. The midsole 126 provides cushioning characteristics to the sole structure 104 while the outsole 128 provides a primary ground-engaging surface of the article of footwear 100. In some examples, the midsole 126 and/or the outsole 128 can each comprise a plurality of subcomponents. For example, as shown in FIG. 6, the midsole 126 includes a bladder 200 and a cushioning member 130 that receives the bladder 200. Likewise, and with reference to FIG. 6, the outsole 128 can include one or more segments (e.g., a forefoot segment 128a, a midfoot segment 128b, and/or a heel segment 128c). The subcomponents of the outsole 128 can be secured to one another or may be individually attached to the midsole 126 such that each segment 128a 128b, 128c of the outsole 128 is individually attached to the midsole 126 and is independent from at least one of the other segments 128a, 128b, 128c of the outsole 128.

FIGS. 7-15 depict the bladder 200 of the midsole 126. Referring to FIG. 15, the bladder 200 includes an opposing pair of barrier elements 202, 204 that can be joined to each other at discrete locations to define a chamber 206 and a peripheral seam 208. In the illustrated configuration, the barrier elements 202, 204 include a first, superior barrier element 202 (e.g., an "upper barrier element 202" when disposed within the midsole 126) and a second, inferior barrier element 204 (e.g., a "lower barrier element 204" when disposed within the midsole 126). While the chamber 206 is described as being formed from two barrier elements 202, 204, the chamber 206 could be formed from any suitable combination of one or more barrier layers. For example, the chamber 206 could be formed by folding a single sheet on itself and joining the folded sheet into the shape shown in FIG. 8 by welding or otherwise attaching opposing portions of the sheet to one another in the shape shown in FIG. 8 at the peripheral seam 208. As shown, the chamber 206 is generally defined as the space between the barrier elements 202, 204, while the peripheral seam 208 defines an outer periphery of the bladder 200. The peripheral seam 208 is formed by attaching opposing portions of the barrier elements 202, 204 together by welding or adhesively bonding the elements 202, 204 at the location of the peripheral seam 208. If welding the elements 202, 204 together, heat and/or pressure may be applied to the elements 202, 204 by a suitable process such as, for example, radio frequency (RF) welding to cause a material of the elements 202, 204 to flow and meld together.

As used herein, the term "barrier layer" (e.g., the barrier elements 202, 204) encompasses both monolayer and multilayer films. In some configurations, one or both of barrier elements 202, 204 are each produced (e.g., thermoformed or blow molded) from a monolayer film (a single layer). In other configurations, one or both of barrier elements 202, 204 are each produced (e.g., thermoformed or blow molded) from a multilayer film (multiple sublayers). In either instance, each layer or sublayer can have a film thickness ranging from about 0.2 micrometers to about 1 millimeter. In further configurations, the film thickness for each layer or sublayer can range from about 0.5 micrometers to about 500 micrometers. In yet further configurations, the film thickness for each layer or sublayer can range from about 1 micrometer to about 100 micrometers.

In some examples, the lower barrier element 204 may have a greater thickness than the upper barrier element 202, whereby the lower barrier element 204 is configured to provide a portion of the ground-contacting surface of the article of footwear 100. In some instances, one or more segments 128a, 128b, 128c of the outsole 128 may be integrally formed as part of the lower barrier element 204.

One or both of the barrier elements 202, 204 can independently be transparent, translucent, and/or opaque. For example, the upper barrier element 202 may be transparent, while the lower barrier element 204 is opaque. As used herein, the term "transparent" for a barrier layer and/or a fluid-filled chamber means that light passes through the barrier layer in substantially straight lines and a viewer can see through the barrier layer. In comparison, for an opaque barrier layer, light does not pass through the barrier layer, and one cannot see clearly through the barrier layer at all. A translucent barrier layer falls between a transparent barrier layer and an opaque barrier layer. Light passes through a translucent layer but some of the light is scattered so that a viewer cannot see clearly through the layer.

Barrier elements 202, 204 can each be produced from an elastomeric material that includes one or more thermoplastic polymers and/or one or more cross-linkable polymers. In some instances, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, the term "polyurethane" refers to a copolymer (including oligomers) that contains a urethane group (— N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In some instances, one or more of the polyurethanes can be produced by polymerizing one or more isocyanates with one or more polyols to produce copolymer chains having (— N(C=O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4-dibenzyl diisocyanate (DBDI), 4-chloro-1,3-phenylene diisocyanate, and combinations thereof. In some configurations, the copolymer chains are substantially free of aromatic groups.

In particular instances, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In other instances, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

The barrier elements 202, 204 may include two or more sublayers (multilayer film) such as described in U.S. Pat. Nos. 5,713,141 and 5,952,065, which are incorporated by reference herein. In examples where the barrier elements 202, 204 include two or more sublayers, examples of suitable multilayer films include microlayer films such as those disclosed in U.S. Pat. No. 6,582,786, which is incorporated by reference herein. In further examples, the barrier elements 202, 204 may each independently include alternating sublayers of one or more TPU copolymer materials and one or more EVOH copolymer materials, where the total number of sublayers in each of barrier elements 202, 204 includes at least four sublayers, at least ten sublayers, at least twenty sublayers, at least forty sublayers, and/or at least sixty sublayers.

The chamber 206 can be produced from barrier elements 202, 204 using any suitable technique, such as thermoforming (e.g., vacuum thermoforming), blow molding, extrusion, injection molding, vacuum molding, rotary molding, transfer molding, pressure forming, heat sealing, casting, low-pressure casting, spin casting, reaction injection molding, radio frequency (RF) welding, and the like. In some examples, the barrier elements 202, 204 can be produced by co-extrusion followed by vacuum thermoforming to produce the chamber 206, which can optionally include one or more valves (e.g., one-way valves) that allows the chamber 206 to be filled with the fluid (e.g., gas). Additional details regarding forming the chamber 206 are provided below.

The chamber 206 can be provided in a fluid-filled (e.g., as provided in the footwear 100) or in an unfilled state. The chamber 206 can be filled to include any suitable fluid, such as a gas or liquid. In an aspect, the gas can include air, nitrogen (N2), or any other suitable gas. In other instances, the chamber 206 can alternatively include other media, such as pellets, beads, ground recycled material, and the like (e.g., foamed beads and/or rubber beads). The fluid provided to the chamber 206 can result in the chamber 206 being pressurized. Alternatively, the fluid provided to the chamber 206 can be at atmospheric pressure such that the chamber 206 is not pressurized but, rather, contains a volume of fluid at atmospheric pressure.

The chamber 206 desirably has a low gas transmission rate to preserve its retained gas pressure. In some examples, the chamber 206 has a gas transmission rate for nitrogen gas that is at least about ten times lower than a nitrogen gas transmission rate for a butyl rubber layer of substantially the same dimensions. In particular instances, the chamber 206 has a nitrogen gas transmission rate of 15 cubic-centimeter/square-meter·atmosphere·day (cm3/m2·atm day) or less for an average film thickness of 500 micrometers (based on thicknesses of barrier elements 202, 204). In further instances, the transmission rate is 10 cm3/m2·atm day or less, 5 cm3/m2·atm day or less, or 1 cm3/m2·atm day or less.

In some implementations, the upper barrier element 202 and the lower barrier element 204 cooperate to define a geometry (e.g., thicknesses, width, and lengths) of the chamber 206. For example, the peripheral seam 208 may cooperate to bound and extend around the chamber 206 to seal the fluid (e.g., air) within the chamber 206. Thus, the chamber 206 is associated with an area of the bladder 200 where interior surfaces 202a, 204a of the upper and lower barrier elements 202, 204 are separated from one another.

The space formed between opposing interior surfaces 202a, 204a of the upper and lower barrier elements 202, 204 defines an interior void of the chamber 206. Similarly, the exterior surfaces 202b, 204b of the upper and lower barrier elements 202, 204 define an exterior profile of the chamber 206. Accordingly, the upper and lower barrier elements 202, 204 define respective upper and lower surfaces of the bladder 200.

As shown in FIGS. 7 and 15, the chamber 206 comprises a border portion 210 (which can also be called "an accumulator portion") and an interior portion 212. The border portion 210 and the interior portion 212 are in fluid communication with one another. The border portion 210 is disposed adjacent to the peripheral seam 208 and extends inwardly toward the interior portion 212. In one configuration, the border portion 210 has a thickness TB that is greater than a thickness TI of the interior portion 212. In other configurations, the thickness of the bladder 200 is substantially the same at the border portion 210 and at the interior portion 212, as shown in FIG. 15. In this configuration, and as shown in FIG. 15, thickness TB is substantially equal to thickness TI.

When assembled within the sole structure 104, the border portion 210 of the bladder 200 (i.e., an outer, peripheral edge of the bladder 200) may be at least partially exposed along a peripheral edge of the sole structure 104. For example, as depicted in FIGS. 1-3, the border portion 210 is exposed along the lateral side 116 and the medial side 118 of the sole structure 104. While the bladder 200 is described and shown as including a border portion 210 that is exposed at the peripheral edge of the sole structure 104, the bladder 200 could alternatively be disposed entirely within the sole structure 104 such that the bladder 200 is not visible at an exterior of the sole structure 104. Further, while the bladder 200 is shown as being exposed at both of the medial side 116 and the lateral side 118, the bladder 200 could only be exposed at one of the medial side 116 and the lateral side 118.

Referring to FIG. 15, the border portion 210 of the chamber 206 has curved, outwardly facing surfaces. Namely, the outer, peripheral edge of the border portion 210 includes arcuate surfaces 211 that meet at the peripheral seam 208. As such, the border portion 210 comprises a generally D-shaped cross-sectional profile when viewed from the perspective depicted in FIG. 15. In other examples, the border portion 210 can comprise various other cross-sectional profiles (e.g., rectangular, ovular, circular, and/or other standard or non-standard geometric shapes). The interior portion 212 of the chamber 206 comprises a generally rectangular cross-sectional profile. In the depicted example, the border portion and the interior portion each have substantially uniform thicknesses and uniform shapes throughout. In other examples, the border portion and the interior portion each have non-uniform thicknesses and non-uniform shapes throughout.

Figure 4:
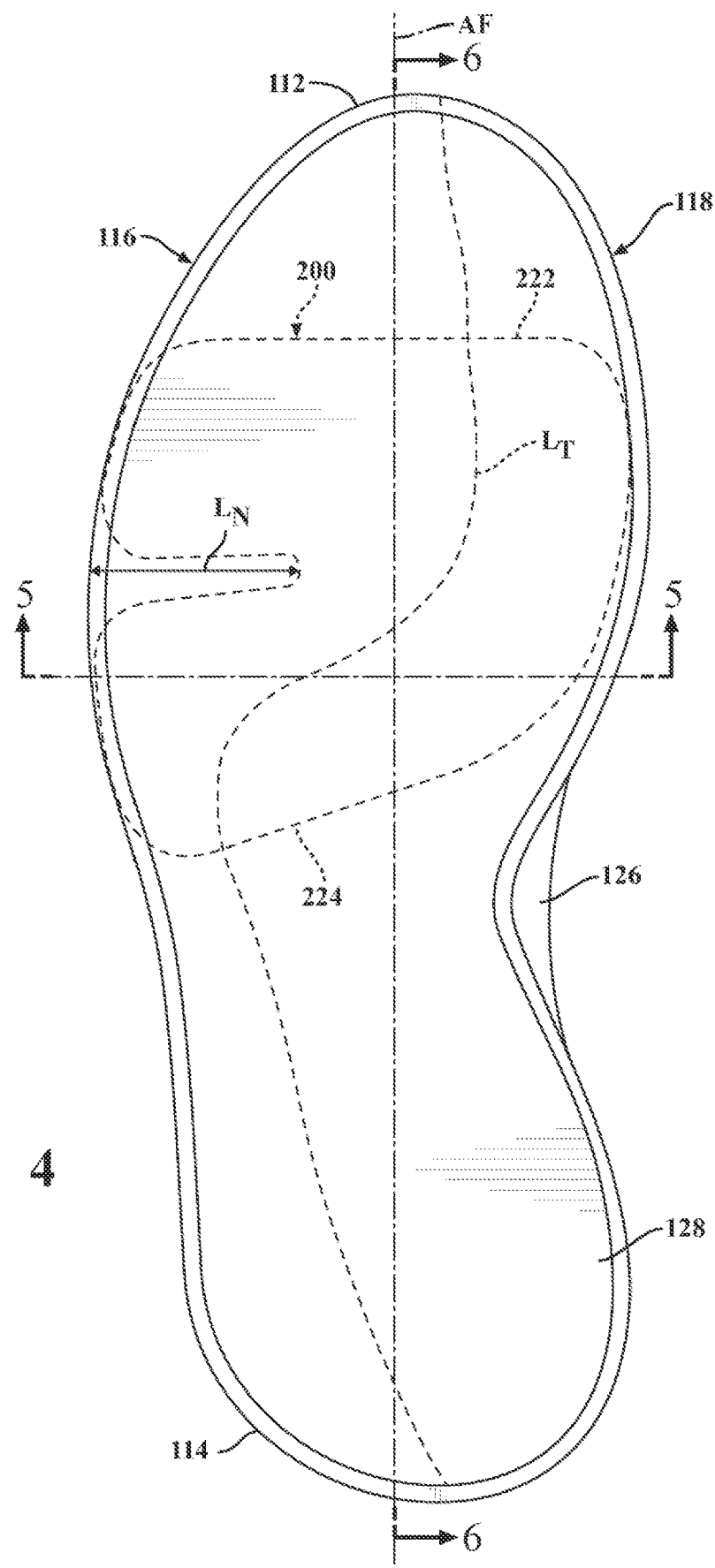
FIG. 4 is a bottom view of a sole structure of the article of footwear of FIG. 1.

Referring now to FIG. 8, the bladder 200 may include a notch 214. The notch 214 extends inwardly from a lateral edge 215 of the bladder 200 toward a medial edge 217 of the bladder 200 to form a channel in the bladder 200. The terms "medial" and "lateral" are used to designate the position of the edges 215, 217 when the bladder 200 is incorporated into the sole structure 104, as shown in FIG. 4. The edges 215, 217, as shown in FIG. 4, are disposed on opposite sides of the bladder 200 from one another. As such, the notch 214 extends into the bladder 200 from a first edge 215 and in a direction toward an opposite side of the bladder (i.e., toward a second edge 217 formed on an opposite side of the bladder 200 than the first edge 215). While the notch 214 will be described hereinafter and shown in the drawings as extending from the lateral edge 215 in a direction toward the medial edge 217, the notch 214 could alternatively extend from the medial edge 217 in a direction toward the lateral edge 215.

The notch 214 is positioned within the bladder 200 in an effort to improve the flexibility of the bladder 200 and, thus, improve the flexibility of the sole structure 104 and footwear 100 incorporating the bladder 200. In some instances, the notch 214 can increase the flexibility of the bladder by up to 50%. In particular instances, the notch 214 can increase the flexibility of the bladder 200 by 35-45%. The notch 214 may be aligned with the ball portion of a wearer's foot (e.g., in the metatarsal head region) and can, for example, allow the bladder 200 to articulate (e.g., flex, pivot, etc.) with the wearer's foot. In particular instances, the notch 214 may be aligned with (e.g., at least partially longitudinally overlap) the first metatarsal head of the wearer's foot. In other instances, the notch 214 may be aligned with the second metatarsal head of the wearer's foot. In other instances, the notch 214 may be aligned with the third metatarsal head of the wearer's foot. In other instances, the notch 214 may be aligned with the fourth metatarsal head of the wearer's foot. In other instances, the notch 214 may be aligned with the fifth metatarsal head of the wearer's foot.

In some examples, the notch 214 may include a substantially uniform width. In such examples, the notch 214 includes a first width WN1 adjacent to the lateral edge 215 of the bladder 200 and a second width WN2 proximate to a terminal end 219 of the notch 214. In this configuration, the widths WN1 and WN2 are approximately equal to one another such that the first width WN1 and the second width WN2 are within 3% of one another. In this manner, the notch 214 comprises a substantially "U" shape. The first width WN1 and the second width WN2 are measured between radii of curvature where the edges of the bladder 200 defining the notch 214 extend at least substantially in a medial/lateral direction. In other examples, the notch 214 may include a non-uniform width. In such examples, the first width WN1 and the second width WN2 differ by more than 3%, as shown in FIGS. 8 and 9. In these cases, the notch 214 comprises a substantially "V" or "tapered" shape. When the notch 214 is tapered, the notch 214 tapers in a direction from the lateral edge 215 toward the terminal end 219 such that the notch 214 decreases in width from the lateral edge 215 to the terminal end 219 (i.e., in a direction from the lateral edge 215 toward the medial edge 217). Such tapering can be constant, as shown in FIGS. 8 and 9, or can vary along the length of the notch 214 from the lateral edge 215 to the terminal end 219. In other instances, the notch 214 can comprise various other shapes and/or widths.

The notch 214 comprises a length LN defined as a straight-line distance from an opening of the notch 214 at the lateral edge 215 to the terminal end 219. In the event that the medial and/or lateral edges are curves, the length LN can be the distance between tangent lines intersecting the curves.

The length LN of the notch 214 can be selected such that the notch 214 (e.g., the terminal end 219 of the notch 214) does not intersect a transition line LT extending along a length of the sole structure 104, as depicted in FIG. 4. The transition line LT represents a primary path of force along the length of the sole structure 104 as a wearer's foot moves from heel to toe during linear movements (e.g., walking, jogging, etc.). Spacing the notch 214 apart from the transition line LT, allows the notch 214 to improve the overall flexibility of the bladder 200 without decreasing the support provided by the bladder 200 during walking and running movements. Further, preventing the notch 214 from crossing the transition line LT reduces the extent to which a wearer might feel the notch 214 under foot during use, thereby increasing the comfort of the wearer.

In some examples, the length LN of the notch 214 can be less than 50% of a max width Wmax of the bladder 200 (FIG. 8). In some examples, the length LN of the notch 214 can be less than 40% of the max width Wmax of the bladder 200. In some examples, the length LN of the notch 214 can be less than 30% of the max width Wmax of the bladder 200. In some examples, the length LN of the notch 214 can be less than 20% of the max width Wmax of the bladder 200. In particular examples, the length LN of the notch 214 can be within a range of 10-50% of the max width Wmax of the bladder 200. In certain examples, the length LN of the notch 214 can be within a range of 20-40% of the max width Wmax of the bladder 200.

In addition to configuring the notch 214 of the bladder 200 such that it is spaced from the transition line LT, in some examples, the border portion 210 of the bladder 200 that defines the notch 214 can have a reduced thickness compared to other locations of the border portion 210 (e.g., the lateral edge 215 and the medial edge 217). Reducing the thickness of the border portion 210 around the notch 214 (e.g., to a thickness equal to or less than the thickness TI of the interior portion) can, for example, improve the feel of the bladder 200 under the wearer's foot.

As shown in FIGS. 8 and 9, the lateral edge 215 and the medial edge 217 are disposed on opposite sides of the bladder 200 and are spaced apart from one another by an anterior edge 222 and a posterior edge 224. The terms "anterior" and "posterior" refer to the positions of the bladder 200 when incorporated into the sole structure 104. Namely, the anterior edge 222 is disposed proximate to the anterior end 112 within the forefoot region 106 while the posterior edge 224 is disposed between the anterior edge 222 and the posterior end 114 and is located within the forefoot region 106 and the midfoot region 108. While these edges 222, 224 will be described hereinafter as being an anterior edge 222 and a posterior edge 224, these edges 222, 224 could alternatively be referred to as a third edge 222 and a fourth edge 224 when referencing the edges 222, 224 apart from the sole structure 104.

The lateral edge 215 may be disposed proximate to the lateral side 116 when incorporated into the sole structure 104 and may include a first segment 221 and a second segment 223. The first segment 221 is separated from the second segment 223 by the notch 214. Each segment 221, 223 includes a substantially straight portion extending along an axis $A_{221}$, $A_{223}$. As shown in FIG. 8, these axes $A_{221}$, $A_{223}$ are convergent with one another and are located on opposite sides of the notch 214. The first segment 221 and the second segment 223 each terminate at the notch 214. As shown, the segments 221, 223 transition into the notch 214 at a radius 225. The radius 225 associated with the first segment 221 and the radius 225 associated with the second segment 223 cooperate to define an opening to the notch 214 as well as the widest point of the notch 214.

As described above, the notch 214 may taper in a direction from the lateral edge 215 to the terminal end 219. As shown in FIGS. 8 and 9, the opening of the notch 214 is the widest point of the notch 214 and may include a different taper than the rest of the notch 214. For example, the notch 214 may taper to a greater extent at the portion of the notch 214 defined by the radii 225 as comparted to the portion of the notch 214 extending between the radii 225 and the terminal end 219.

The medial edge 217 is disposed on an opposite side of the bladder 200 than the lateral edge 215 and includes a substantially convex surface 227. The convex surface 227 may provide the medial edge 217 with a curved profile that matches or is substantially similar to a curvature of the midsole 126, as shown in FIG. 4. Providing the medial edge 217 with a curved profile that is similar to that of the midsole 126 allows the bladder 200 to align with an outer edge of the midsole 126 and, in so doing, maximize the amount of coverage the bladder 200 provides.

The anterior edge 222 extends between and connects the first segment 221 of the lateral edge 215 and the convex surface 227 of the medial edge 217. As shown in FIGS. 8 and 9, the anterior edge 222 is connected to the first segment 221 of the lateral edge 215 by an arcuate segment 229 and is connected to the medial edge 217 by an arcuate segment 231. The anterior edge 222 includes a substantially planar portion 233 extending between and connecting the arcuate segment 229 and the arcuate segment 233. The planar portion 233 extends along an axis $A_{233}$.

The posterior edge 224 extends between the second segment 223 of the lateral edge 215 and the convex surface 227 of the medial edge 217. As shown in FIGS. 8 and 9, the posterior edge 224 is connected to the second segment 223 of the lateral edge 215 by an arcuate segment 235 and is connected to the medial edge 217 by an arcuate segment 237. The posterior edge 224 includes a substantially planar portion 239 extending between and connecting the arcuate segment 235 and the arcuate segment 237. The planar portion 239 extends along an axis $A_{239}$.

The foregoing edges 215, 217, 222, 224 provide the bladder 200 with an asymmetric shape. Namely, the bladder 200 is asymmetric about an axis extending through the center of the bladder 200 from the lateral edge 215 to the medial edge 217 and is asymmetric about an axis extending through the center of the bladder 200 from the anterior edge 222 to the posterior edge 224.

With continued reference to FIGS. 8 and 9, the axis $A_{233}$ and the axis $A_{239}$ are shown as being convergent with one another. In the configuration shown in FIG. 9, the axes $A_{233}$, $A_{239}$ extend in a direction away from one another at the lateral edge 215. The axes $A_{233}$, $A_{239}$ extend away from one another at the lateral edge 215 due to the shape of the bladder 200 on either side of the notch 214. Specifically, the bladder 200 includes a first segment 240 disposed between the notch 214 and the anterior edge 222 and a second segment 242 disposed between the notch 214 and the posterior edge 224. The first segment 240 and the second segment 242 extend from a common location 244 between the terminal end 219 of the notch 214 and the medial edge 217. The first segment 240 extends from the medial edge 217 to the first segment 221 of the lateral edge 215. Similarly, the second segment 242 extends from the medial edge 217 to the second segment 223 of the lateral edge 215. As shown, the second segment 242 may be longer than the first segment 240. The second segment 242 may be longer than the first segment 240 to allow the second segment 242 to extend from the medial side 118 of the sole structure 104 within the forefoot region 106 to the lateral side 116 of the sole structure 104 in the midfoot region 108. This way, the bladder 200 can maximize coverage of the transition line LT to enhance cushioning and support during wear.

Referring now to FIGS. 10-14, the peripheral seam 208 of the bladder 200 can comprise a first segment 216 disposed adjacent to an inferior surface 248 of the bladder 200 defined by the second barrier element 204 and a second segment 218 disposed adjacent to a superior surface 246 of the bladder 200 defined by the first barrier element 202. The peripheral seam 208 can also include a transition segment 220 disposed between the first segment 216 and the second segment 218. As shown in FIGS. 10, 12, and 13, the first segment 216 of the peripheral seam 208 is disposed on the lateral, anterior, and posterior sides of the bladder 200. As shown in FIGS. 11-13, the second segment 218 of the peripheral seam 208 is disposed on the medial, anterior, and posterior sides of the bladder 200. As shown in FIGS. 12 and 13, the transition segment 220 of the peripheral seam 208 is disposed on the anterior and posterior sides of the bladder 200. In this manner, the peripheral seam 208 of the bladder 200 can be referred to as "a jogged seam" (e.g., the seam 208 "jogs" from the inferior surface 248 to the superior surface 246 of the bladder 200 around a periphery of the bladder 200) and extends through a majority of a thickness of the bladder 200 from the inferior surface 248 to the superior surface 246.

Configuring the bladder 200 with a jogged peripheral seam can, for example, provide functional and/or aesthetic benefits. As one example, a bladder can have one or more functional and/or aesthetical properties on a first portion of the bladder (e.g., a lateral side) and one or more different functional and/or aesthetic properties on a second portion of the bladder (e.g., a medial side), as will be described in more detail below.

Referring now to FIG. 5, the first segment 216 of the peripheral seam 208 is disposed proximate to or substantially aligned with the inferior surface 248 of the bladder 200 and is disposed on the lateral side 116 of the footwear 100. This configuration can, for example, provide the functional benefit of increased stability. Namely, locating the peripheral seam 208 proximate to the inferior surface 248 likewise positions the peripheral seam 208 proximate to the outsole 128. In so doing, the relatively rigid seam 208 (created by melding a material of the first barrier element 202 and the second barrier element 204 together) is attached to the midsole 126 proximate to a junction of the midsole 126 and the outsole 128, which allows the rigid seam 208 to act as an anchor and resist deformation of the bladder 200 during cutting or side-to-side movements. The configuration also provides an aesthetic benefit, as the first segment 216 of the peripheral seam 208 is hidden from the perspective of someone looking downwardly at the footwear 100, as depicted by reference number 234 (FIG. 5). The first segment 216 is hidden by a material of the midsole 126 and/or a material of the outsole 128 such that only the upper barrier element 202 is visible at a periphery of the sole structure 104.

The second segment 218 of the peripheral seam 208 is disposed proximate to or substantially aligned with the superior surface 246 of the bladder 200 and is disposed on the medial side 118 of the footwear 100. This configuration can, for example, facilitate installation of the bladder 200 into the midsole 126 of the sole structure 104. For example, positioning the peripheral seam 208 proximate to or aligned with the superior surface 246 allows the lower barrier element 204 to have a reduced profile due to the material of the seam 208 being moved proximate to the top of the bladder 200. In so doing, a material of the midsole 126 and/or the outsole 128 can more easily wrap up onto the second barrier element 204 by having an increased radius and, further, can allow the outsole 128 and, thus, the sole structure 104, to have a reduced profile. Note that in one configuration, the bladder 200 is surrounded by a material of the midsole 126 such that the material of the midsole 126 extends between the bladder 200 and the strobel 103 and between the bladder 200 and the outsole 128. In another configuration, the outsole 128 may be directly attached to the bladder 200 at the lower barrier element 204 such that a material of the midsole 126 only extends around a portion of the bladder 200 and between the bladder 200 and the strobel 103.

Note that while the first segment 216 is described and shown as being disposed on the lateral side 116 of the footwear 100 and the second segment 218 is described and shown as being disposed on the medial side 118 of the footwear 100, the first segment 216 could be disposed on the medial side 118 of the footwear 100 and the second segment 218 could be disposed on the lateral side 116 of the footwear 100. Additionally or alternatively, the transition segment 220 can be disposed on the medial side 118 and/or the lateral side 116 of the bladder 200.

With reference to FIG. 14, an alternate configuration of the peripheral seam 208 is provided. The peripheral seam shown in FIG. 14 is identical to the peripheral seam 208 shown in FIG. 10 with the exception of the portion of the seam located within the notch 214. Accordingly, like reference numerals are used hereinafter and in drawings to identify like components while like reference numerals containing a letter extension are used to identify those components that have been modified.

In the configuration shown in FIG. 14, a bladder 200a is shown having a peripheral seam 208a that extends into the notch 214 but, rather than having the seam located proximate to the inferior surface 248 along both edges of the notch 214, as shown in FIG. 10, the peripheral seam 208a extends in a direction toward the superior surface 246 proximate to the radius 225 associated with the first segment 221 and the second segment 223 of the lateral edge 215. This portion of the peripheral seam 208a then extends along the notch 214 at an approximate midpoint of a thickness of the bladder 200a (i.e., substantially centrally located between the superior surface 246 and the inferior surface 248). Accordingly, the peripheral seam 208a extends into the notch 214 at a location that is higher or closer to the superior surface 246 when comparted to the peripheral seam 208 of the bladder 200 (FIG. 10). As shown in FIG. 14, the resulting seam 208a extends around a periphery of the bladder 200a within the notch 214 at a location that is at an approximate midpoint of a thickness of the bladder 200a from an opening of the notch 214 at the first segment 221, to a distal end 219a of the notch 214, and from the distal end 219a to the second segment 223.

Extending the peripheral seam 208a into the notch 214 such that the peripheral seam 208a extends proximate to a midpoint of a thickness of the bladder 200a within the notch 214 facilitates compression of the bladder 200a by requiring less force to collapse the bladder 200a along the length of the notch 214 and at the terminal end 219a as compared to the bladder 220.

The jogged seams 208, 208a provide manufacturing and weight advantages in addition to the performance advantages outlined above. Namely, the jogged seams 208, 208a allow for use of thinner barrier elements when compared to conventional bladders. This is due to the fact that the barrier layers are not required to have a deep draw around an entire perimeter thereof during formation of the bladder 200, 200a. Rather, when the seam 208, 208a is aligned with or substantially aligned with a surface 246, 248 of the respective barrier elements 202, 204, the draw required to form the bladder 200, 200a at these locations is minimal, thereby allowing for use of a thinner barrier layer during manufacturing. Further, use of relatively thinner barrier layers distributes material stretching more evenly across both barrier elements 202, 204, as compared to forming the entire border portion 210 in a single barrier layer. Alternatively, if barrier layers of typical thickness are used, the bladder 200 will be more stable and/or resilient due to use of the jogged seam 208, 208a, as each barrier element 202, 204 undergoes less deformation because only a portion of the layer is stretched.

Also, although the bladder 200 is disposed at the forefoot region 106 and the midfoot region 108 of the footwear 100, in other examples, a bladder with a jogged seam and/or a notch can be disposed at various other locations of the footwear (e.g., a heel region).

In some instances, a first barrier layer can comprise one or more properties (e.g., color, opacity, translucency, thickness, material type, etc.), and a second barrier layer can comprise one or more different properties. The different barrier layers can, for example, create different performance and/or aesthetic properties. For example, a bladder with a jogged seam and barrier layers of different color can be configured such that the bladder appears to have a first color on a first portion (e.g., a lateral side) of the footwear and a second color on a second portion (e.g., a medial side) of the footwear.

In the depicted example, the transition segment 220 of the peripheral seam 208 is positioned such that it is not visible to the wearer and/or an observer when the footwear 100 is assembled. In other instances, however, a transition segment of a peripheral seam 208 could be positioned relative to the footwear such that it is visible to the wearer and/or an observer when the footwear is assembled. Regardless of whether the transition segment 220 is visible once assembled to the sole structure 104 or not, the transition segment 220 may extend along a length of the bladder 200 from a first end of the bladder 200 to a second end of the bladder 200, as shown in FIGS. 12 and 13. The transition segment 220 extends between and connects the first segment 216 and the second segment 218 and gradually increases in height from the first segment 216 to the second segment 218. In one configuration, the transition segment 220 increases in height at a constant rate between the first segment 216 and the second segment 218 such that the transition segment 220 has a substantially constant slope. In other configurations, the transition segment 220 may include a different slope between the first segment 216 and the second segment 218 for at least a portion of the length of the transition segment 220.

The bladder 200 can comprise various shapes. For example, as shown in FIG. 8, the medial and/or posterior sides of the bladder 200 can comprise an arcuate or curved shape. The lateral edge 215 can be angled or tapered from the notch 214 in the anterior-medial and/or posterior-medial directions. In other words, the bladder 200 is wider adjacent to the notch 214 than at the anterior-lateral and/or posterior-lateral corners of the bladder 200. When viewed from the superior side (e.g., FIG. 8), the bladder comprises a substantially "C" shape. In other examples, various other shapes, degrees of curvature, degrees of taper, etc. can be used.

It should be noted that, although the bladder 200 comprises a notch 214 and a jogged peripheral seam 208, a bladder can comprise any one of these features without having one or more of the others. For example, a bladder can comprise a jogged peripheral seam and not comprise a notch. As another example, a bladder can comprise a notch and not comprise a jogged peripheral seam.

In addition to being filled with a fluid, in some instances, at least a portion of a chamber of a bladder can be filled with one or more components. The filling material/components can, for example, improve the resiliency and/or durability of the bladder.

For example, referring to FIG. 15, the chamber 206 of the bladder 200 includes one or more tensile strands 226 disposed therein. In some examples, the tensile strands 226 can be referred to as tensile elements. Each tensile strand 226 can extend between an upper tensile sheet 228 and a lower tensile sheet 230. The upper tensile sheet 228 may be attached to the first barrier element 202 while the lower tensile sheet 230 may be attached to the second barrier element 204. In this manner, when the chamber 206 of the bladder 200 receives a pressurized fluid, the tensile strands 226 are placed in tension. Because the upper tensile sheet 228 is attached to the first barrier element 202 and the lower tensile sheet 230 is attached to the second barrier element 204, the tensile strands 226 retain a desired shape of the chamber 206 when pressurized fluid is injected into the chamber via a port 232.

In lieu of or in addition to the tensile strands, in some instances, a bladder can comprise a foam element disposed within a chamber of the bladder. For example, FIGS. 16 and 17 depict a bladder 300. The bladder 300 is configured similar to the bladder 200, except that the bladder 300 comprises a foam element 326 disposed in an interior portion 312 of a chamber 306 of the bladder 300 rather than having tensile strands 226 disposed in the chamber 206 like the bladder 200. Given the similarities between the bladder 200 and the bladder 300, the reference numerals of the bladder 300 correspond to similar components of the bladder 200, unless stated otherwise. Namely, one hundred (100) is added to the corresponding reference number from the bladder 200 to identify like components in the bladder 300. For example, reference numerals 302 and 304 respectively correspond to reference numerals 202 and 204 in the bladder 200.

The bladder 300 can, for example, be used with the footwear 100 in lieu of the bladder 200. As with the bladder 200, the bladder 300 can be pressurized to a pressure above ambient pressure.

The bladders 200 and 300 can be formed in various ways. Several exemplary methods are provided below with respect to the bladder 200. The bladder 300 can be formed in a similar manner.

In some examples, a bladder can be formed without tensile strands and/or a foam element disposed within the chamber. For example, in some instances, the bladder 200 can be filled with a fluid via a port (e.g., the port 232) but not have any other material added to the chamber.

In some implementations, the upper and lower barrier elements 202, 204 are formed by respective mold portions each defining various surfaces for forming depressions and pinched surfaces corresponding to locations where the peripheral seam 208 is formed when the upper barrier element 202 and the lower barrier element 204 are joined and bonded together. In some implementations, adhesive bonding joins the upper barrier element 202 and the lower barrier element 204 to form the peripheral seam 208. In other implementations, the upper barrier element 202 and the lower barrier element 204 are joined to form the peripheral seam 208 by thermal bonding. In some examples, one or both of the barrier elements 202, 204 are heated to a temperature that facilitates shaping and melding. In some examples, the barrier elements 202, 204 are heated prior to being located between their respective molds. In other examples, the mold may be heated to raise the temperature of the barrier elements 202, 204. In some implementations, a molding process used to form the chamber 206 incorporates vacuum ports within mold portions to remove air such that the upper and lower barrier elements 202, 204 are drawn into contact with respective mold portions. In other implementations, fluids such as air may be injected into areas between the upper and lower barrier elements 202, 204 such that the resulting increase in pressure causes the barrier elements 202, 204 to engage with surfaces of their respective mold portions.

The cushioning member 130 and the bladder 200 of the midsole 126 can be configured to mate in various ways. For example, in some instances, the cushioning member 130 can be over-molded onto the bladder 200 such that the bladder 200 is at least partially embedded or encapsulated by the cushioning member 130. In such instances, a top surface of the cushioning member 130 defines a profile of the footbed and may be contoured to correspond to a shape of the foot. Further, a material of the cushioning member 130 may completely or partially fill the notch 214. As shown in FIGS. 1 and 2, a material of the cushioning member 130 fills the notch 214 and separates the first segment 221 of the lateral edge 215 from the second segment 223 of the lateral edge 215 at an outer periphery of the sole structure 104. In other instances, the cushioning member 130 can be formed with a recessed pocket configured to receive the bladder 200. In such instances, a top surface of the cushioning member 130 and the superior surface 246 of the bladder 200 define a profile of the footbed and may be contoured to correspond to a shape of the foot. Finally, a bottom surface of the cushioning member 130 may cooperate with the bladder 200, whereby the bottom surface can, in some examples, include a pocket formed in the forefoot region 106 and/or the midfoot region 108 that interfaces with the bladder 200.

Peripheral surfaces of the cushioning member 130, including lateral and/or medial side surfaces, can include one or more recesses or windows. In some examples, a window can allow one or more portions of the bladder 200 to be visible and/or partially protrude from the peripheral surface of the cushioning member 130. For example, referring to FIGS. 2 and 3, the lateral side of the cushioning member 130 includes two lateral windows 132 and one medial window 134. In other examples, a cushioning member can have more or fewer windows than the depicted example. The windows can be disposed at various other locations (e.g., a heel region).

In other instances where the bladder 200 is fully encapsulated (i.e., completely surrounded) by the cushioning member 130, windows are not provided in the cushioning member 130. In these instances, the bladder 200 is hidden from view by a material of the cushioning member 130.

As described above, the cushioning member 130 is formed of a resilient polymeric material, such as foam or rubber, to impart properties of cushioning, responsiveness, and energy distribution to the foot of the wearer. Example resilient polymeric materials for the cushioning member 130 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In some instances, the one or more polymers may include olefinic homopolymers, olefinic copolymers, or blends thereof. Examples of olefinic polymers include polyethylene, polypropylene, and combinations thereof. In other aspects, the one or more polymers may include one or more ethylene copolymers, such as, ethylene-vinyl acetate (EVA) copolymers, EVOH copolymers, ethylene-ethyl acrylate copolymers, ethylene-unsaturated mono-fatty acid copolymers, and combinations thereof.

In further examples, the one or more polymers may include one or more polyacrylates, such as polyacrylic acid, esters of polyacrylic acid, polyacrylonitrile, polyacrylic acetate, polymethyl acrylate, polyethyl acrylate, polybutyl acrylate, polymethyl methacrylate, and polyvinyl acetate; including derivatives thereof, copolymers thereof, and any combinations thereof.

In yet further examples, the one or more polymers may include one or more ionomeric polymers. In these aspects, the ionomeric polymers may include polymers with carboxylic acid functional groups, sulfonic acid functional groups, salts thereof (e.g., sodium, magnesium, potassium, etc.), and/or anhydrides thereof. For instance, the ionomeric polymer(s) may include one or more fatty acid-modified ionomeric polymers, polystyrene sulfonate, ethylene-methacrylic acid copolymers, and combinations thereof.

In further examples, the one or more polymers may include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In further examples, the one or more polymers may include one or more polyamide copolymers (e.g., polyamide-polyether copolymers) and/or one or more polyurethanes (e.g., crosslinked polyurethanes and/or thermoplastic polyurethanes). Examples of suitable polyurethanes include those discussed above for barrier elements 202, 204. Alternatively, the one or more polymers may include one or more natural and/or synthetic rubbers, such as butadiene and isoprene.

When the resilient polymeric material is a foamed polymeric material, the foamed material may be foamed using a physical blowing agent which phase transitions to a gas based on a change in temperature and/or pressure, or a chemical blowing agent which forms a gas when heated above its activation temperature. For example, the chemical blowing agent may be an azo compound such as adodicarbonamide, sodium bicarbonate, and/or an isocyanate.

In some instances, the foamed polymeric material may be a crosslinked foamed material. In these examples, a peroxide-based crosslinking agent such as dicumyl peroxide may be used. Furthermore, the foamed polymeric material may include one or more fillers such as pigments, modified or natural clays, modified or unmodified synthetic clays, talc glass fiber, powdered glass, modified or natural silica, calcium carbonate, mica, paper, wood chips, and the like.

The resilient polymeric material may be formed using a molding process. In one example, when the resilient polymeric material is a molded elastomer, the uncured elastomer (e.g., rubber) may be mixed in a Banbury mixer with an optional filler and a curing package such as a sulfur-based or peroxide-based curing package, calendared, formed into shape, placed in a mold, and vulcanized.

In another example, when the resilient polymeric material is a foamed material, the material may be foamed during a molding process, such as an injection molding process. A thermoplastic polymeric material may be melted in the barrel of an injection molding system and combined with a physical or chemical blowing agent and optionally a crosslinking agent, and then injected into a mold under conditions which activate the blowing agent, forming a molded foam.

Optionally, when the resilient polymeric material is a foamed material, the foamed material may be a compression molded foam. Compression molding may be used to alter the physical properties (e.g., density, stiffness and/or durometer)

of a foam, or to alter the physical appearance of the foam (e.g., to fuse two or more pieces of foam, to shape the foam, etc.), or both.

The compression molding process desirably starts by forming one or more foam preforms, such as by injection molding and foaming a polymeric material, by forming foamed particles or beads, by cutting foamed sheet stock, and the like. The compression molded foam may then be made by placing the one or more preforms formed of foamed polymeric material(s) in a compression mold and applying sufficient pressure to the one or more preforms to compress the one or more preforms in a closed mold. Once the mold is closed, sufficient heat and/or pressure is applied to the one or more preforms in the closed mold for a sufficient duration of time to alter the preform(s) by forming a skin on the outer surface of the compression molded foam, fuse individual foam particles to each other, permanently increase the density of the foam(s), or any combination thereof. Following the heating and/or application of pressure, the mold is opened, and the molded foam article is removed from the mold.

As mentioned above, the outsole 128 (see, e.g., FIGS. 1 and 4) is the primary ground-engaging surface of the footwear 100. Although shown schematically as a relatively smooth surface for purposes of illustration, the outsole 128 can include various traction-enhancing elements. For example, an outsole can include grooves, lugs, ribs, spikes, cleats, etc. The outsole can, in some instances, be relatively uniform across the footwear. In other instances, the outsole can comprise various segments with different materials and/or traction-enhancing elements. In addition to being disposed on the inferior surface of the footwear, in some examples, the outsole can be disposed on one or more other surfaces. For example, an outsole can comprise a toe cap and/or a heel cap configured to protect ends of the footwear.

The outsole 128 can be formed of resilient materials that impart properties of abrasion resistance and traction to the sole structure 104. One or more of the outsole segments may be formed of a first material having a higher durometer than the others of the outsole segments. For example, one segment may be formed of a rubber material having a first durometer, while another segment is formed of a foam material having a second durometer, less than the first durometer.

With particular reference to FIG. 18, the bladder 200 is shown as being incorporated into a first midsole 126 intended for use in a left-footed sole structure 104 and into a second midsole 126 intended for use in a right-footed sole structure 104. As shown, when the sole structures 104 are positioned relative to one another during use (i.e., such that the left-footed sole structure 104 is worn on a wearer's left foot and the right-footed sole structure 104 is worn on a wearer's right foot), the medial side 118 of the left-footed sole structure 104 opposes the medial side 118 of the right-footed sole structure 104. Accordingly, and with reference to FIG. 19, the second segment 218 of the peripheral seam 208 of the left-footed sole structure 104 opposes the second segment 218 of the peripheral seam 208 of the right-footed sole structure 104. In FIG. 19, only the bladder 200 of the left-footed sole structure 104 and the bladder 200 of the right-footed sole structure 104 are shown in side-by-side relation to one another for clarity.

Positioning the bladders 200 of the left-footed sole structure 104 and the right-footed sole structure 104 in the foregoing manner positions the segments 218 of the seam 208 that are located proximate to a top of the bladders 200 (i.e., proximate to the superior surface 246) in opposition to one another. In so doing, the first segments 216 of the seam 208 of the respective bladders 200 that are located proximate to a bottom of the bladders 200 (i.e., proximate to the inferior surface 248) are located at the lateral side 116 of the respective sole structures 104 and face in opposite directions.

While the bladders 200 are shown as being positioned such that the segments 218 of the seam 208 oppose one another, the bladders 200 could be positioned such that the segments 216 of the seam 208 oppose one another. For example, the seam 208, as thus far described, extends from the superior surface 246 at the arcuate segment 229 of the lateral edge 215 to the inferior surface 248 at the arcuate segment 231 of the medial edge 217. In order to position the bladder 200 such that the segments 216 of the seam 208 oppose one another when a left-footed sole structure 104 is positioned relative to a right-footed sole structure 104 during wear, the seam 208 needs to be modified such that the seam 208 extends from the superior surface 246 at the medial edge 217 to the inferior surface 248 at the lateral edge 215, as set forth below.

With reference to FIG. 20, the bladders 200b of the right-footed sole structure 104 and the left-footed sole structure 104 are modified relative to the bladders 200 shown in FIGS. 18 and 19. In view of the substantial similarity in structure and function of the bladder 200b with respect to the bladder 200, like reference numerals are used hereinafter and in the drawings to identify like components while like reference numerals containing letter extensions are used to identify those components that have been modified.

The bladders 200b of FIG. 20 include a seam 208b that extends from the arcuate surface 229b proximate to the superior surface 246 at the lateral edge 215 to the arcuate surface 231b proximate to the inferior surface 248 at the medial edge 217. Accordingly, the transition segment 220b extends in an opposite direction than the transition segment 220 and, as such, provides the anterior edge 222b with a different configuration than the anterior edge 222. Note that while the anterior edge 222b is described as being modified relative to the anterior edge 222, the posterior edge 224 could additionally or alternatively be modified in the same or similar manner.

Modifying the anterior edge 222b, as described above, allows the bladders 200b to be positioned as shown in FIG. 20 when the left-footed sole structure 104 and the right-footed sole structure 104 are positioned relative to one another during use (i.e., the left-footed sole structure 104 is attached to a left foot and the right-footed sole structure 104 is attached to a right foot). Namely, the lower segments 216b of the seam 208b oppose one another at the medial edge 217 while the upper segments 218b of the seam 208b are disposed at the respective lateral edges 215 of the left-footed sole structure 104 and the right-footed sole structure 104 and face in opposite directions.

With reference to FIGS. 21 and 22, an alternate bladder 200c for use with the article of footwear 100 is shown. In view of the substantial similarity in structure and function of the bladder 200c with respect to the bladder 200, like reference numerals are used hereinafter and in the drawings to identify like components while like reference numerals containing letter extensions are used to identify those components that have been modified.

As shown in FIG. 21, the bladder 200c includes a seam 208c having a first segment 216c that is disposed proximate to the inferior surface 248 and a second segment 218c that is disposed proximate to the superior surface 246. As shown, the first segment 216c is disposed at the medial edge 217c of the bladder 200c while the second segment 218c is disposed at the lateral edge 215c of the bladder 200c. Accordingly, when the bladder 200c is installed in the article of footwear 10, the first segment 216c is disposed at the medial side 118 of the sole structure 104 and the second segment 218c is disposed at the lateral side 116 of the sole structure 104.

The bladder 200c is similar in shape to the bladder 200 but does not include a notch 214. Rather, the bladder 200c includes a depression 414 disposed at an approximate location of the notch 214 of the bladder 200. The depression 414 is formed in the lateral edge 215c and extends in a direction toward the medial edge 217c. Finally, while the bladder 200c does not include tensile strands 226 or a foam element 326 disposed within the chamber 206c, the bladder 200c could include either structure in a similar fashion as shown in FIGS. 15 and 17. Further, like the bladder 200, the bladder 200c may be pressurized whether the bladder 200c includes tensile strands 226, a foam element 326, or a chamber 206c that is free from such structures.

With reference to FIGS. 23 and 24, an alternate bladder 200d for use with the article of footwear 100 is shown. In view of the substantial similarity in structure and function of the bladder 200d with respect to the bladder 200, like reference numerals are used hereinafter and in the drawings to identify like components while like reference numerals containing letter extensions are used to identify those components that have been modified.

As shown in FIG. 23, the bladder 200d includes a seam 208d having a first segment 216d that is disposed proximate to the inferior surface 248 and a second segment 218d that is disposed proximate to the superior surface 246. As shown, the first segment 216d is disposed at the medial edge 217d of the bladder 200d while the second segment 218d is disposed at the lateral edge 215d of the bladder 200d. Accordingly, when the bladder 200d is installed in the article of footwear 10, the first segment 216d is disposed at the medial side 118 of the sole structure 104 and the second segment 218d is disposed at the lateral side 116 of the sole structure 104.

The bladder 200d is similar in shape to the bladder 200 but does not include a notch 214. Rather, the bladder 200d includes an arcuate surface 515 extending substantially along the entire length of the lateral edge 215d. In one configuration, the arcuate surface 515 may have a substantially constant radius. In other configurations, the arcuate surface 515 may include different radii at different locations along the surface 515. Finally, while the bladder 200d does not include tensile strands 226 or a foam element 326 disposed within the chamber 206d, the bladder 200d could include either structure in a similar fashion as shown in FIGS. 15 and 17. Further, like the bladder 200, the bladder 200d may be pressurized whether the bladder 200d includes tensile strands 226, a foam element 326, or a chamber 206d that is free from such structures.

With reference to FIGS. 25 and 26, an alternate bladder 200e for use with the article of footwear 100 is shown. In view of the substantial similarity in structure and function of the bladder 200e with respect to the bladder 200, like reference numerals are used hereinafter and in the drawings to identify like components while like reference numerals containing letter extensions are used to identify those components that have been modified.

As shown in FIG. 25, the bladder 200e includes a seam 208e having a first segment 216e that is disposed proximate to the superior surface 246e and a second segment 218e that is disposed proximate to the inferior surface 248e. As shown, the bladder 200e is substantially oval in shape and, as such, is symmetric about an axes $A_1$, $A_2$, passing through the center of the bladder 200e. In one configuration, the bladder 200e may be positioned within the sole structure 104 such that the first segment 216e is disposed at the medial edge 217e of the bladder 200e while the second segment 218e is disposed at the lateral edge 215e of the bladder 200e. Accordingly, when the bladder 200e is installed in the article of footwear 10, the first segment 216e is disposed at the medial side 118 of the sole structure 104 and the second segment 218e is disposed at the lateral side 116 of the sole structure 104. Alternatively, the bladder 200e may be rotated 180° relative to the view shown in FIGS. 25 and 26 such that the first segment 216e is disposed at the lateral edge 215e and the second segment 218e is disposed at the medial edge 215e. Accordingly, when the bladder 200e is installed in the article of footwear 10 in this configuration, the first segment 216e is disposed at the lateral side 116 of the sole structure 104 and the second segment 218e is disposed at the medial side 118 of the sole structure 104.

While the bladder 200c does not include tensile strands 226 or a foam element 326 disposed within the chamber 206c, the bladder 200c could include either structure in a similar fashion as shown in FIGS. 15 and 17. Further, like the bladder 200, the bladder 200c may be pressurized whether the bladder 200c includes tensile strands 226, a foam element 326, or a chamber 206c that is free from such structures.

With reference to FIGS. 27 and 28, an alternate bladder 200f for use with the article of footwear 100 is shown. In view of the substantial similarity in structure and function of the bladder 200f with respect to the bladder 200, like reference numerals are used hereinafter and in the drawings to identify like components while like reference numerals containing letter extensions are used to identify those components that have been modified.

As shown in FIG. 27, the bladder 200f includes a seam 208f having a first segment 216f that is disposed proximate to the superior surface 246f and a second segment 218f that is disposed proximate to the inferior surface 248f As shown, the bladder 200f has an irregular shape including tensile strands 226f disposed within a chamber 206f In one configuration, the bladder 200f may be positioned within the sole structure 104 such that the first segment 216f is disposed at the medial edge 217f of the bladder 200f while the second segment 218f is disposed at the lateral edge 215f of the bladder 200f. Accordingly, when the bladder 200f is installed in the article of footwear 10, the first segment 216f is disposed at the medial side 118 of the sole structure 104 and the second segment 218f is disposed at the lateral side 116 of the sole structure 104. Alternatively, the bladder 200f may be rotated 180° relative to the view shown in FIGS. 27 and 28 such that the first segment 216f is disposed at the lateral edge 215f and the second segment 218f is disposed at the medial edge 215f Accordingly, when the bladder 200f is installed in the article of footwear 10 in this configuration, the first segment 216f is disposed at the lateral side 116 of the sole structure 104 and the second segment 218f is disposed at the medial side 118 of the sole structure 104.

While the bladder 200f does not include a foam element 326 disposed within the chamber 206f, the bladder 200f could include a foam element 326 in place of the tensile strands 226f, as shown in FIG. 17. Further, like the bladder 200, the bladder 200f may be pressurized whether the bladder 200f includes tensile strands 226f, a foam element 326, or a chamber 206f that is free from such structures.

In the foregoing examples, the bladders 200-200f serve to provide an article of footwear 100 with support and cushioning properties. The bladders 200-200f may include a notch 214 or a depression 414 to facilitate bending of the bladders 200-200f during use. Further, the bladders 200-200f include a jogged peripheral seam 208-208f that provides the bladders 200-200f with stability and improved aesthetics simultaneously.

The following Clauses provide an exemplary configuration for a bladder for an article of footwear described above.

Clause 1. A bladder comprising a first barrier element having a first surface formed on a first side of the first barrier element and a second surface formed on an opposite side of the first barrier element than the first surface, a second barrier element having a third surface formed on a first side of the second barrier element and a fourth surface formed on an opposite side of the second barrier element than the third surface, and a peripheral seam joining the first barrier element and the second barrier element to define an interior void between the first surface and the third surface, the peripheral seam including a first segment extending along the bladder proximate to the second surface, a second segment extending along the bladder proximate to the fourth surface, and a third segment extending between and connecting the first segment and the second segment.

Clause 2. The bladder of Clause 1, wherein the third segment extends through a majority of a thickness of the bladder from the first segment to the second segment.

Clause 3. The bladder of any of the preceding Clauses, wherein the third segment includes a substantially constant slope between the first segment and the second segment.

Clause 4. The bladder of any of the preceding Clauses, further comprising a notch extending into the bladder from a peripheral edge of the bladder to define a channel.

Clause 5. The bladder of Clause 4, wherein the peripheral seam includes a fourth segment extending along a first edge of the notch, a fifth segment extending along a second edge of the notch, and a sixth segment extending along a distal end of the notch and connecting the fourth segment and the fifth segment.

Clause 6. The bladder of Clause 5, wherein the fourth segment, the fifth segment, and the sixth segment extend along the bladder proximate to one of the second surface and the fourth surface.

Clause 7. The bladder of Clause 5, wherein the fourth segment extends along the bladder proximate to one of the second surface and the fourth surface and the fifth segment extends along the bladder proximate to the other of the second surface and the fourth surface.

Clause 8. The bladder of Clause 7, wherein the sixth segment extends through a majority of a thickness of the bladder from the fourth segment to the fifth segment.

Clause 9. The bladder of any of the preceding Clauses, wherein the bladder is pressurized.

Clause 10. An article of footwear incorporating the bladder of any of the preceding Clauses.

Clause 11. A bladder comprising a first barrier element having a first surface formed on a first side of the first barrier element and a second surface formed on an opposite side of the first barrier element than the first surface, a second barrier element having a third surface formed on a first side of the second barrier element and a fourth surface formed on an opposite side of the second barrier element than the third surface, and a peripheral seam joining the first barrier element and the second barrier element to define an interior void between the first surface and the third surface, the peripheral seam including a first segment extending along the bladder proximate to the second surface at a first side of the bladder and a second segment extending along the bladder proximate to the fourth surface on an opposite, second side of the bladder.

Clause 12. The bladder of Clause 11, further comprising a third segment extending through a majority of a thickness of the bladder from the first segment to the second segment.

Clause 13. The bladder of Clause 12, wherein the third segment includes a substantially constant slope between the first segment and the second segment.

Clause 14. The bladder of any of the preceding Clauses, further comprising a notch extending into the bladder from a peripheral edge of the bladder to define a channel.

Clause 15. The bladder of Clause 14, wherein the peripheral seam includes a fourth segment extending along a first edge of the notch, a fifth segment extending along a second edge of the notch, and a sixth segment extending along a distal end of the notch and connecting the fourth segment and the fifth segment.

Clause 16. The bladder of Clause 15, wherein the fourth segment, the fifth segment, and the sixth segment extend along the bladder proximate to one of the second surface and the fourth surface.

Clause 17. The bladder of Clause 15, wherein the fourth segment extends along the bladder proximate to one of the second surface and the fourth surface and the fifth segment extends along the bladder proximate to the other of the second surface and the fourth surface.

Clause 18. The bladder of Clause 17, wherein the sixth segment extends through a majority of a thickness of the bladder from the fourth segment to the fifth segment.

Clause 19. The bladder of any of the preceding Clauses, wherein the bladder is pressurized.

Clause 20. An article of footwear incorporating the bladder of any of the preceding Clauses.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A bladder comprising:
   a first barrier element having a first surface formed on a first side of the first barrier element and a second surface formed on an opposite side of the first barrier element than the first surface;
   a second barrier element having a third surface formed on a first side of the second barrier element and a fourth surface formed on an opposite side of the second barrier element than the third surface;
   a peripheral seam joining the first barrier element and the second barrier element to define an interior void between the first surface and the third surface, the peripheral seam including a first segment extending along a bottom portion of the bladder closer to the fourth surface than the second surface, a second segment extending along a top portion of the bladder closer to the second surface than the fourth surface, and a third segment extending between and connecting the first segment and the second segment; and a notch extending into the bladder from a peripheral edge of the bladder to define a V-shaped channel having a first edge, a second edge, and a distal end, the first segment of the peripheral seam extending along the first edge, the second edge, and the distal end.

2. The bladder of claim 1, wherein the third segment extends through a majority of a thickness of the bladder from the first segment to the second segment.

3. The bladder of claim 1, wherein the third segment includes a slope between the first segment and the second segment.

4. The bladder of claim 1, wherein the bladder is pressurized.

5. An article of footwear incorporating the bladder of claim 1.

6. The bladder of claim 1, further comprising a first chamber portion and a second chamber portion, the first chamber portion and the second chamber portion cooperating with one another to define at least a portion of the interior void and in fluid communication with one another.

7. The bladder of claim 6, wherein the notch is disposed between and separates the first chamber portion and the second chamber portion.

8. The bladder of claim 7, wherein the first chamber portion and the second chamber portion are convergent.

9. The bladder of claim 6, further comprising a third chamber portion extending between and fluidly coupling the first chamber portion and the second chamber portion.

10. A bladder comprising:
    a first barrier element having a first surface formed on a first side of the first barrier element and a second surface formed on an opposite side of the first barrier element than the first surface;
    a second barrier element having a third surface formed on a first side of the second barrier element and a fourth surface formed on an opposite side of the second barrier element than the third surface;
    a peripheral seam joining the first barrier element and the second barrier element to define an interior void between the first surface and the third surface, the peripheral seam including a first segment extending along a bottom portion of the bladder closer to the fourth surface than the second surface at a first side of the bladder and a second segment extending along a top portion of the bladder closer to the second surface than the fourth surface at an opposite, second side of the bladder; and
    a notch extending into the bladder from a peripheral edge of the bladder to define a V-shaped channel having a first edge, a second edge, and a distal end, the first segment of the peripheral seam extending along the first edge, the second edge, and the distal end.

11. The bladder of claim 10, further comprising a third segment extending through a majority of a thickness of the bladder from the first segment to the second segment.

12. The bladder of claim 11, wherein the third segment includes a slope between the first segment and the second segment.

13. The bladder of claim 10, wherein the bladder is pressurized.

14. An article of footwear incorporating the bladder of claim 10.

15. The bladder of claim 10, further comprising a first chamber portion and a second chamber portion, the first chamber portion and the second chamber portion cooperating with one another to define at least a portion of the interior void and in fluid communication with one another.

16. The bladder of claim 15, wherein the notch is disposed between and separates the first chamber portion and the second chamber portion.

17. The bladder of claim 16, wherein the first chamber portion and the second chamber portion are convergent.

18. The bladder of claim 15, further comprising a third chamber portion extending between and fluidly coupling the first chamber portion and the second chamber portion.

* * * * *